(12) United States Patent
Bellegarda et al.

(10) Patent No.: US 8,645,137 B2
(45) Date of Patent: Feb. 4, 2014

(54) FAST, LANGUAGE-INDEPENDENT METHOD FOR USER AUTHENTICATION BY VOICE

(75) Inventors: Jerome R. Bellegarda, Los Gatos, CA (US); Kim E. A. Silverman, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 518 days.

(21) Appl. No.: 11/811,955

(22) Filed: Jun. 11, 2007

(65) Prior Publication Data

US 2007/0294083 A1    Dec. 20, 2007

Related U.S. Application Data

(63) Continuation of application No. 09/527,498, filed on Mar. 16, 2000, now abandoned.

(51) Int. Cl.
    *G10L 17/00*      (2013.01)
    *G10L 21/00*      (2013.01)

(52) U.S. Cl.
    USPC ............................ 704/250; 704/246; 704/273

(58) Field of Classification Search
    USPC .......................................... 704/250, 273, 270
    See application file for complete search history.

(56) References Cited

U.S. PATENT DOCUMENTS

| | | | |
|---|---|---|---|
| 3,704,345 A | 11/1972 | Coker et al. | |
| 3,828,132 A | 8/1974 | Flanagan et al. | |
| 3,979,557 A | 9/1976 | Schulman et al. | |
| 4,278,838 A | 7/1981 | Antonov | |
| 4,282,405 A | 8/1981 | Taguchi | |
| 4,310,721 A | 1/1982 | Manley et al. | |
| 4,348,553 A | 9/1982 | Baker et al. | |
| 4,653,021 A | 3/1987 | Takagi | |
| 4,688,195 A | 8/1987 | Thompson et al. | |
| 4,692,941 A | 9/1987 | Jacks et al. | |
| 4,718,094 A | 1/1988 | Bahl et al. | |
| 4,724,542 A | 2/1988 | Williford | |
| 4,726,065 A | 2/1988 | Froessl | |
| 4,727,354 A | 2/1988 | Lindsay | |

(Continued)

FOREIGN PATENT DOCUMENTS

| | | |
|---|---|---|
| EP | 0218859 A2 | 4/1987 |
| EP | 0262938 A1 | 4/1988 |

(Continued)

OTHER PUBLICATIONS

Tomoko Matsui, Sadaoki Furui, "Speaker Adaptation of Tied-Mixture-Based Phoneme Models for Text-Prompted Speaker Recognitions", 1994 IEEE International Conference on Acoustics, Speech and Signal Processing, Apr. 19-22, 1994, p. I-125-I-128.

(Continued)

*Primary Examiner* — Angela A Armstrong
(74) *Attorney, Agent, or Firm* — Morgan, Lewis & Bockius LLP

(57) ABSTRACT

A method and system for training a user authentication by voice signal are described. In one embodiment, a set of feature vectors are decomposed into speaker-specific recognition units. The speaker-specific recognition units are used to compute distribution values to train the voice signal. In addition, spectral feature vectors are decomposed into speaker-specific characteristic units which are compared to the speaker-specific distribution values. If the speaker-specific characteristic units are within a threshold limit of the speaker-specific distribution values, the speech signal is authenticated.

41 Claims, 7 Drawing Sheets

(56) References Cited

U.S. PATENT DOCUMENTS

| | | |
|---|---|---|
| 4,776,016 A | 10/1988 | Hansen |
| 4,783,807 A | 11/1988 | Marley |
| 4,811,243 A | 3/1989 | Racine |
| 4,819,271 A | 4/1989 | Bahl et al. |
| 4,827,520 A | 5/1989 | Zeinstra |
| 4,829,576 A | 5/1989 | Porter |
| 4,833,712 A | 5/1989 | Bahl et al. |
| 4,839,853 A | 6/1989 | Deerwester et al. |
| 4,852,168 A | 7/1989 | Sprague |
| 4,862,504 A | 8/1989 | Nomura |
| 4,878,230 A | 10/1989 | Murakami et al. |
| 4,903,305 A | 2/1990 | Gillick et al. |
| 4,905,163 A | 2/1990 | Garber et al. |
| 4,914,586 A | 4/1990 | Swinehart et al. |
| 4,944,013 A | 7/1990 | Gouvianakis et al. |
| 4,965,763 A | 10/1990 | Zamora |
| 4,974,191 A | 11/1990 | Amirghodsi et al. |
| 4,977,598 A | 12/1990 | Doddington et al. |
| 4,992,972 A | 2/1991 | Brooks et al. |
| 5,010,574 A | 4/1991 | Wang |
| 5,020,112 A | 5/1991 | Chou |
| 5,021,971 A | 6/1991 | Lindsay |
| 5,022,081 A | 6/1991 | Hirose et al. |
| 5,027,406 A | 6/1991 | Roberts et al. |
| 5,031,217 A | 7/1991 | Nishimura |
| 5,032,989 A | 7/1991 | Tornetta |
| 5,040,218 A | 8/1991 | Vitale et al. |
| 5,072,452 A | 12/1991 | Brown et al. |
| 5,091,945 A | 2/1992 | Kleijn |
| 5,127,053 A | 6/1992 | Koch |
| 5,127,055 A | 6/1992 | Larkey |
| 5,128,672 A | 7/1992 | Kaehler |
| 5,133,011 A | 7/1992 | McKiel, Jr. |
| 5,142,584 A | 8/1992 | Ozawa |
| 5,164,900 A | 11/1992 | Bernath |
| 5,165,007 A | 11/1992 | Bahl et al. |
| 5,179,652 A | 1/1993 | Rozmanith et al. |
| 5,194,950 A | 3/1993 | Murakami et al. |
| 5,199,077 A | 3/1993 | Wilcox et al. |
| 5,202,952 A | 4/1993 | Gillick et al. |
| 5,208,862 A | 5/1993 | Ozawa |
| 5,216,747 A | 6/1993 | Hardwick et al. |
| 5,220,639 A | 6/1993 | Lee |
| 5,220,657 A | 6/1993 | Bly et al. |
| 5,222,146 A | 6/1993 | Bahl et al. |
| 5,230,036 A | 7/1993 | Akamine et al. |
| 5,235,680 A | 8/1993 | Bijnagte |
| 5,267,345 A | 11/1993 | Brown et al. |
| 5,268,990 A | 12/1993 | Cohen et al. |
| 5,282,265 A | 1/1994 | Rohra Suda et al. |
| RE34,562 E | 3/1994 | Murakami et al. |
| 5,291,286 A | 3/1994 | Murakami et al. |
| 5,293,448 A | 3/1994 | Honda |
| 5,293,452 A | 3/1994 | Picone et al. |
| 5,297,170 A | 3/1994 | Eyuboglu et al. |
| 5,301,109 A | 4/1994 | Landauer et al. |
| 5,303,406 A | 4/1994 | Hansen et al. |
| 5,317,507 A | 5/1994 | Gallant |
| 5,317,647 A | 5/1994 | Pagallo |
| 5,325,297 A | 6/1994 | Bird et al. |
| 5,325,298 A | 6/1994 | Gallant |
| 5,327,498 A | 7/1994 | Hamon |
| 5,333,236 A | 7/1994 | Bahl et al. |
| 5,333,275 A | 7/1994 | Wheatley et al. |
| 5,345,536 A | 9/1994 | Hoshimi et al. |
| 5,349,645 A | 9/1994 | Zhao |
| 5,353,377 A | 10/1994 | Kuroda et al. |
| 5,377,301 A | 12/1994 | Rosenberg et al. |
| 5,384,892 A | 1/1995 | Strong |
| 5,384,893 A | 1/1995 | Hutchins |
| 5,386,494 A | 1/1995 | White |
| 5,386,556 A | 1/1995 | Hedin et al. |
| 5,390,279 A | 2/1995 | Strong |
| 5,396,625 A | 3/1995 | Parkes |
| 5,400,434 A | 3/1995 | Pearson |
| 5,424,947 A | 6/1995 | Nagao et al. |
| 5,434,777 A | 7/1995 | Luciw |
| 5,455,888 A | 10/1995 | Iyengar et al. |
| 5,469,529 A | 11/1995 | Bimbot et al. |
| 5,475,587 A | 12/1995 | Anick et al. |
| 5,479,488 A | 12/1995 | Lennig et al. |
| 5,491,772 A | 2/1996 | Hardwick et al. |
| 5,502,790 A | 3/1996 | Yi |
| 5,502,791 A | 3/1996 | Nishimura et al. |
| 5,515,475 A | 5/1996 | Gupta et al. |
| 5,536,902 A | 7/1996 | Serra et al. |
| 5,574,823 A | 11/1996 | Hassanein et al. |
| 5,577,241 A | 11/1996 | Spencer |
| 5,579,436 A | 11/1996 | Chou et al. |
| 5,581,655 A | 12/1996 | Cohen et al. |
| 5,596,676 A | 1/1997 | Swaminathan et al. |
| 5,608,624 A | 3/1997 | Luciw |
| 5,613,036 A | 3/1997 | Strong |
| 5,617,507 A | 4/1997 | Lee et al. |
| 5,621,859 A | 4/1997 | Schwartz et al. |
| 5,642,464 A | 6/1997 | Yue et al. |
| 5,642,519 A | 6/1997 | Martin |
| 5,664,055 A | 9/1997 | Kroon |
| 5,675,819 A | 10/1997 | Schuetze |
| 5,682,539 A | 10/1997 | Conrad et al. |
| 5,687,077 A | 11/1997 | Gough, Jr. |
| 5,712,957 A | 1/1998 | Waibel et al. |
| 5,727,950 A | 3/1998 | Cook et al. |
| 5,729,694 A | 3/1998 | Holzrichter et al. |
| 5,732,390 A | 3/1998 | Katayanagi et al. |
| 5,734,791 A | 3/1998 | Acero et al. |
| 5,737,487 A | 4/1998 | Bellegarda et al. |
| 5,748,974 A | 5/1998 | Johnson |
| 5,790,978 A | 8/1998 | Olive et al. |
| 5,794,050 A | 8/1998 | Dahlgren et al. |
| 5,794,182 A | 8/1998 | Manduchi et al. |
| 5,799,276 A | 8/1998 | Komissarchik et al. |
| 5,826,261 A | 10/1998 | Spencer |
| 5,828,999 A * | 10/1998 | Bellegarda et al. ............ 704/240 |
| 5,835,893 A | 11/1998 | Ushioda |
| 5,839,106 A | 11/1998 | Bellegarda |
| 5,860,063 A | 1/1999 | Gorin et al. |
| 5,864,806 A | 1/1999 | Mokbel et al. |
| 5,867,799 A | 2/1999 | Lang et al. |
| 5,873,056 A | 2/1999 | Liddy et al. |
| 5,895,466 A | 4/1999 | Goldberg et al. |
| 5,899,972 A | 5/1999 | Miyazawa et al. |
| 5,913,193 A | 6/1999 | Huang et al. |
| 5,915,249 A | 6/1999 | Spencer |
| 5,943,670 A | 8/1999 | Prager |
| 5,987,404 A | 11/1999 | Della Pietra et al. |
| 6,016,471 A | 1/2000 | Kuhn et al. |
| 6,029,132 A | 2/2000 | Kuhn et al. |
| 6,038,533 A | 3/2000 | Buchsbaum et al. |
| 6,052,656 A | 4/2000 | Suda et al. |
| 6,064,960 A | 5/2000 | Bellegarda et al. |
| 6,081,750 A | 6/2000 | Hoffberg et al. |
| 6,088,731 A | 7/2000 | Kiraly et al. |
| 6,108,627 A | 8/2000 | Sabourin |
| 6,122,616 A | 9/2000 | Henton |
| 6,141,644 A * | 10/2000 | Kuhn et al. .................. 704/273 |
| 6,144,938 A | 11/2000 | Surace et al. |
| 6,173,261 B1 | 1/2001 | Arai et al. |
| 6,188,999 B1 | 2/2001 | Moody |
| 6,195,641 B1 | 2/2001 | Loring et al. |
| 6,208,971 B1 | 3/2001 | Bellegarda et al. |
| 6,233,559 B1 | 5/2001 | Balakrishnan |
| 6,246,981 B1 | 6/2001 | Papineni et al. |
| 6,266,637 B1 | 7/2001 | Donovan et al. |
| 6,278,970 B1 | 8/2001 | Milner |
| 6,285,786 B1 | 9/2001 | Seni et al. |
| 6,308,149 B1 | 10/2001 | Gaussier et al. |
| 6,317,594 B1 | 11/2001 | Gossman et al. |
| 6,317,707 B1 | 11/2001 | Bangalore et al. |
| 6,317,831 B1 | 11/2001 | King |
| 6,321,092 B1 | 11/2001 | Fitch et al. |
| 6,334,103 B1 | 12/2001 | Surace et al. |
| 6,343,267 B1 | 1/2002 | Kuhn et al. |
| 6,356,854 B1 | 3/2002 | Schubert et al. |

(56) References Cited

U.S. PATENT DOCUMENTS

| | | | |
|---|---|---|---|
| 6,366,883 B1 | 4/2002 | Campbell et al. | |
| 6,366,884 B1 | 4/2002 | Bellegarda et al. | |
| 6,421,672 B1 | 7/2002 | McAllister et al. | |
| 6,434,524 B1 | 8/2002 | Weber | |
| 6,446,076 B1 | 9/2002 | Burkey et al. | |
| 6,453,292 B2 | 9/2002 | Ramaswamy et al. | |
| 6,466,654 B1 | 10/2002 | Cooper et al. | |
| 6,477,488 B1 | 11/2002 | Bellegarda | |
| 6,487,534 B1 | 11/2002 | Thelen et al. | |
| 6,490,560 B1 * | 12/2002 | Ramaswamy et al. | 704/250 |
| 6,493,667 B1 * | 12/2002 | de Souza et al. | 704/240 |
| 6,499,013 B1 | 12/2002 | Weber | |
| 6,501,937 B1 | 12/2002 | Ho et al. | |
| 6,505,158 B1 | 1/2003 | Conkie | |
| 6,513,063 B1 | 1/2003 | Julia et al. | |
| 6,523,061 B1 | 2/2003 | Halverson et al. | |
| 6,526,395 B1 | 2/2003 | Morris | |
| 6,532,444 B1 | 3/2003 | Weber | |
| 6,532,446 B1 | 3/2003 | King | |
| 6,553,344 B2 | 4/2003 | Bellegarda et al. | |
| 6,598,039 B1 | 7/2003 | Livowsky | |
| 6,601,026 B2 | 7/2003 | Appelt et al. | |
| 6,604,059 B2 | 8/2003 | Strubbe et al. | |
| 6,615,172 B1 | 9/2003 | Bennett et al. | |
| 6,615,175 B1 | 9/2003 | Gazdzinski | |
| 6,631,346 B1 | 10/2003 | Karaorman et al. | |
| 6,633,846 B1 | 10/2003 | Bennett et al. | |
| 6,647,260 B2 | 11/2003 | Dusse et al. | |
| 6,650,735 B2 | 11/2003 | Burton et al. | |
| 6,654,740 B2 | 11/2003 | Tokuda et al. | |
| 6,665,639 B2 | 12/2003 | Mozer et al. | |
| 6,665,640 B1 | 12/2003 | Bennett et al. | |
| 6,665,641 B1 | 12/2003 | Coorman et al. | |
| 6,684,187 B1 | 1/2004 | Conkie | |
| 6,691,111 B2 | 2/2004 | Lazaridis et al. | |
| 6,691,151 B1 | 2/2004 | Cheyer et al. | |
| 6,697,780 B1 | 2/2004 | Beutnagel et al. | |
| 6,735,632 B1 | 5/2004 | Kiraly et al. | |
| 6,742,021 B1 | 5/2004 | Halverson et al. | |
| 6,757,362 B1 | 6/2004 | Cooper et al. | |
| 6,757,718 B1 | 6/2004 | Halverson et al. | |
| 6,778,951 B1 | 8/2004 | Contractor | |
| 6,778,952 B2 | 8/2004 | Bellegarda | |
| 6,778,962 B1 | 8/2004 | Kasai et al. | |
| 6,792,082 B1 | 9/2004 | Levine | |
| 6,807,574 B1 | 10/2004 | Partovi et al. | |
| 6,810,379 B1 | 10/2004 | Vermeulen et al. | |
| 6,813,491 B1 | 11/2004 | McKinney | |
| 6,832,194 B1 | 12/2004 | Mozer et al. | |
| 6,842,767 B1 | 1/2005 | Partovi et al. | |
| 6,847,966 B1 | 1/2005 | Sommer et al. | |
| 6,851,115 B1 | 2/2005 | Cheyer et al. | |
| 6,859,931 B1 | 2/2005 | Cheyer et al. | |
| 6,895,380 B2 | 5/2005 | Sepe, Jr. | |
| 6,895,558 B1 | 5/2005 | Loveland | |
| 6,912,499 B1 | 6/2005 | Sabourin et al. | |
| 6,928,614 B1 | 8/2005 | Everhart | |
| 6,937,975 B1 | 8/2005 | Elworthy | |
| 6,937,986 B2 | 8/2005 | Denenberg et al. | |
| 6,964,023 B2 | 11/2005 | Maes et al. | |
| 6,980,949 B2 | 12/2005 | Ford | |
| 6,980,955 B2 | 12/2005 | Okutani et al. | |
| 6,985,865 B1 | 1/2006 | Packingham et al. | |
| 6,988,071 B1 | 1/2006 | Gazdzinski | |
| 6,996,531 B2 | 2/2006 | Korall et al. | |
| 6,999,927 B2 | 2/2006 | Mozer et al. | |
| 7,020,685 B1 | 3/2006 | Chen et al. | |
| 7,027,974 B1 | 4/2006 | Busch et al. | |
| 7,036,128 B1 | 4/2006 | Julia et al. | |
| 7,050,977 B1 | 5/2006 | Bennett | |
| 7,058,569 B2 | 6/2006 | Coorman et al. | |
| 7,062,428 B2 | 6/2006 | Hogenhout et al. | |
| 7,069,560 B1 | 6/2006 | Cheyer et al. | |
| 7,092,887 B2 | 8/2006 | Mozer et al. | |
| 7,092,928 B1 | 8/2006 | Elad et al. | |
| 7,093,693 B1 | 8/2006 | Gazdzinski | |
| 7,127,046 B1 | 10/2006 | Smith et al. | |
| 7,136,710 B1 | 11/2006 | Hoffberg et al. | |
| 7,137,126 B1 | 11/2006 | Coffman et al. | |
| 7,139,714 B2 | 11/2006 | Bennett et al. | |
| 7,139,722 B2 | 11/2006 | Perrella et al. | |
| 7,177,798 B2 | 2/2007 | Hsu et al. | |
| 7,197,460 B1 | 3/2007 | Gupta et al. | |
| 7,200,559 B2 | 4/2007 | Wang | |
| 7,203,646 B2 | 4/2007 | Bennett | |
| 7,216,073 B2 | 5/2007 | Lavi et al. | |
| 7,216,080 B2 | 5/2007 | Tsiao et al. | |
| 7,225,125 B2 | 5/2007 | Bennett et al. | |
| 7,233,790 B2 | 6/2007 | Kjellberg et al. | |
| 7,233,904 B2 | 6/2007 | Luisi | |
| 7,266,496 B2 | 9/2007 | Wang et al. | |
| 7,277,854 B2 | 10/2007 | Bennett et al. | |
| 7,290,039 B1 | 10/2007 | Lisitsa et al. | |
| 7,299,033 B2 | 11/2007 | Kjellberg et al. | |
| 7,310,600 B1 | 12/2007 | Garner et al. | |
| 7,324,947 B2 | 1/2008 | Jordan et al. | |
| 7,349,953 B2 | 3/2008 | Lisitsa et al. | |
| 7,376,556 B2 | 5/2008 | Bennett | |
| 7,376,645 B2 | 5/2008 | Bernard | |
| 7,379,874 B2 | 5/2008 | Schmid et al. | |
| 7,386,449 B2 | 6/2008 | Sun et al. | |
| 7,392,185 B2 | 6/2008 | Bennett | |
| 7,398,209 B2 | 7/2008 | Kennewick et al. | |
| 7,403,938 B2 | 7/2008 | Harrison et al. | |
| 7,409,337 B1 | 8/2008 | Potter et al. | |
| 7,415,100 B2 | 8/2008 | Cooper et al. | |
| 7,418,392 B1 | 8/2008 | Mozer et al. | |
| 7,426,467 B2 | 9/2008 | Nashida et al. | |
| 7,427,024 B1 | 9/2008 | Gazdzinski et al. | |
| 7,447,635 B1 | 11/2008 | Konopka et al. | |
| 7,454,351 B2 | 11/2008 | Jeschke et al. | |
| 7,467,087 B1 | 12/2008 | Gillick et al. | |
| 7,475,010 B2 | 1/2009 | Chao | |
| 7,483,894 B2 | 1/2009 | Cao | |
| 7,487,089 B2 | 2/2009 | Mozer | |
| 7,496,498 B2 | 2/2009 | Chu et al. | |
| 7,496,512 B2 | 2/2009 | Zhao et al. | |
| 7,502,738 B2 | 3/2009 | Kennewick et al. | |
| 7,508,373 B2 | 3/2009 | Lin et al. | |
| 7,522,927 B2 | 4/2009 | Fitch et al. | |
| 7,523,108 B2 | 4/2009 | Cao | |
| 7,526,466 B2 | 4/2009 | Au | |
| 7,529,671 B2 | 5/2009 | Rockenbeck et al. | |
| 7,529,676 B2 | 5/2009 | Koyama | |
| 7,539,656 B2 | 5/2009 | Fratkina et al. | |
| 7,546,382 B2 | 6/2009 | Healey et al. | |
| 7,548,895 B2 | 6/2009 | Pulsipher | |
| 7,555,431 B2 | 6/2009 | Bennett | |
| 7,558,730 B2 | 7/2009 | Davis et al. | |
| 7,571,106 B2 | 8/2009 | Cao et al. | |
| 7,599,918 B2 | 10/2009 | Shen et al. | |
| 7,620,549 B2 | 11/2009 | Di Cristo et al. | |
| 7,624,007 B2 | 11/2009 | Bennett | |
| 7,634,409 B2 | 12/2009 | Kennewick et al. | |
| 7,636,657 B2 | 12/2009 | Ju et al. | |
| 7,640,160 B2 | 12/2009 | Di Cristo et al. | |
| 7,647,225 B2 | 1/2010 | Bennett et al. | |
| 7,657,424 B2 | 2/2010 | Bennett | |
| 7,672,841 B2 | 3/2010 | Bennett | |
| 7,676,026 B1 | 3/2010 | Baxter, Jr. | |
| 7,684,985 B2 | 3/2010 | Dominach et al. | |
| 7,693,715 B2 | 4/2010 | Hwang et al. | |
| 7,693,720 B2 | 4/2010 | Kennewick et al. | |
| 7,698,131 B2 | 4/2010 | Bennett | |
| 7,702,500 B2 | 4/2010 | Blaedow | |
| 7,702,508 B2 | 4/2010 | Bennett | |
| 7,707,027 B2 | 4/2010 | Balchandran et al. | |
| 7,707,032 B2 | 4/2010 | Wang et al. | |
| 7,707,267 B2 | 4/2010 | Lisitsa et al. | |
| 7,711,565 B1 | 5/2010 | Gazdzinski | |
| 7,711,672 B2 | 5/2010 | Au | |
| 7,716,056 B2 | 5/2010 | Weng et al. | |
| 7,720,674 B2 | 5/2010 | Kaiser et al. | |
| 7,720,683 B1 | 5/2010 | Vermeulen et al. | |

(56) References Cited

U.S. PATENT DOCUMENTS

| | | |
|---|---|---|
| 7,725,307 B2 | 5/2010 | Bennett |
| 7,725,318 B2 | 5/2010 | Gavalda et al. |
| 7,725,320 B2 | 5/2010 | Bennett |
| 7,725,321 B2 | 5/2010 | Bennett |
| 7,729,904 B2 | 6/2010 | Bennett |
| 7,729,916 B2 | 6/2010 | Coffman et al. |
| 7,734,461 B2 | 6/2010 | Kwak et al. |
| 7,752,152 B2 | 7/2010 | Paek et al. |
| 7,774,204 B2 | 8/2010 | Mozer et al. |
| 7,783,486 B2 | 8/2010 | Rosser et al. |
| 7,801,729 B2 | 9/2010 | Mozer |
| 7,809,570 B2 | 10/2010 | Kennewick et al. |
| 7,809,610 B2 | 10/2010 | Cao |
| 7,818,176 B2 | 10/2010 | Freeman et al. |
| 7,822,608 B2 | 10/2010 | Cross, Jr. et al. |
| 7,826,945 B2 | 11/2010 | Zhang et al. |
| 7,831,426 B2 | 11/2010 | Bennett |
| 7,840,400 B2 | 11/2010 | Lavi et al. |
| 7,840,447 B2 | 11/2010 | Kleinrock et al. |
| 7,873,519 B2 | 1/2011 | Bennett |
| 7,873,654 B2 | 1/2011 | Bernard |
| 7,881,936 B2 | 2/2011 | Longé et al. |
| 7,912,702 B2 | 3/2011 | Bennett |
| 7,917,367 B2 | 3/2011 | Di Cristo et al. |
| 7,917,497 B2 | 3/2011 | Harrison et al. |
| 7,920,678 B2 | 4/2011 | Cooper et al. |
| 7,925,525 B2 | 4/2011 | Chin |
| 7,930,168 B2 | 4/2011 | Weng et al. |
| 7,949,529 B2 | 5/2011 | Weider et al. |
| 7,949,534 B2 | 5/2011 | Davis et al. |
| 7,974,844 B2 | 7/2011 | Sumita |
| 7,974,972 B2 | 7/2011 | Cao |
| 7,983,915 B2 | 7/2011 | Knight et al. |
| 7,983,917 B2 | 7/2011 | Kennewick et al. |
| 7,983,997 B2 | 7/2011 | Allen et al. |
| 7,987,151 B2 | 7/2011 | Schott et al. |
| 8,000,453 B2 | 8/2011 | Cooper et al. |
| 8,005,679 B2 | 8/2011 | Jordan et al. |
| 8,015,006 B2 | 9/2011 | Kennewick et al. |
| 8,024,195 B2 | 9/2011 | Mozer et al. |
| 8,036,901 B2 | 10/2011 | Mozer |
| 8,041,570 B2 | 10/2011 | Mirkovic et al. |
| 8,041,611 B2 | 10/2011 | Kleinrock et al. |
| 8,055,708 B2 | 11/2011 | Chitsaz et al. |
| 8,065,155 B1 | 11/2011 | Gazdzinski |
| 8,065,156 B2 | 11/2011 | Gazdzinski |
| 8,069,046 B2 | 11/2011 | Kennewick et al. |
| 8,073,681 B2 | 12/2011 | Baldwin et al. |
| 8,078,473 B1 | 12/2011 | Gazdzinski |
| 8,082,153 B2 | 12/2011 | Coffman et al. |
| 8,095,364 B2 | 1/2012 | LongÉ et al. |
| 8,099,289 B2 | 1/2012 | Mozer et al. |
| 8,107,401 B2 | 1/2012 | John et al. |
| 8,112,275 B2 | 2/2012 | Kennewick et al. |
| 8,112,280 B2 | 2/2012 | Lu |
| 8,117,037 B2 | 2/2012 | Gazdzinski |
| 8,131,557 B2 | 3/2012 | Davis et al. |
| 8,140,335 B2 | 3/2012 | Kennewick et al. |
| 8,165,886 B1 | 4/2012 | Gagnon et al. |
| 8,166,019 B1 | 4/2012 | Lee et al. |
| 8,190,359 B2 | 5/2012 | Bourne |
| 8,195,467 B2 | 6/2012 | Mozer et al. |
| 8,204,238 B2 | 6/2012 | Mozer |
| 8,205,788 B1 | 6/2012 | Gazdzinski et al. |
| 8,219,407 B1 | 7/2012 | Roy et al. |
| 8,285,551 B2 | 10/2012 | Gazdzinski |
| 8,285,553 B2 | 10/2012 | Gazdzinski |
| 8,290,778 B2 | 10/2012 | Gazdzinski |
| 8,290,781 B2 | 10/2012 | Gazdzinski |
| 8,296,146 B2 | 10/2012 | Gazdzinski |
| 8,296,153 B2 | 10/2012 | Gazdzinski |
| 8,301,456 B2 | 10/2012 | Gazdzinski |
| 8,311,834 B1 | 11/2012 | Gazdzinski |
| 8,370,158 B2 | 2/2013 | Gazdzinski |
| 8,371,503 B2 | 2/2013 | Gazdzinski |
| 8,447,612 B2 | 5/2013 | Gazdzinski |
| 2002/0032564 A1 | 3/2002 | Ehsani et al. |
| 2002/0046025 A1 | 4/2002 | Hain |
| 2002/0069063 A1 | 6/2002 | Buchner et al. |
| 2002/0077817 A1 | 6/2002 | Atal |
| 2004/0135701 A1 | 7/2004 | Yasuda et al. |
| 2005/0071332 A1 | 3/2005 | Ortega et al. |
| 2005/0080625 A1 | 4/2005 | Bennett et al. |
| 2005/0119897 A1 | 6/2005 | Bennett et al. |
| 2005/0143972 A1 | 6/2005 | Gopalakrishnan et al. |
| 2005/0182629 A1 | 8/2005 | Coorman et al. |
| 2005/0196733 A1 | 9/2005 | Budra et al. |
| 2006/0018492 A1 | 1/2006 | Chiu et al. |
| 2006/0122834 A1 | 6/2006 | Bennett |
| 2006/0143007 A1 | 6/2006 | Koh et al. |
| 2007/0055529 A1 | 3/2007 | Kanevsky et al. |
| 2007/0058832 A1 | 3/2007 | Hug et al. |
| 2007/0088556 A1 | 4/2007 | Andrew |
| 2007/0100790 A1 | 5/2007 | Cheyer et al. |
| 2007/0118377 A1 | 5/2007 | Badino et al. |
| 2007/0174188 A1 | 7/2007 | Fish |
| 2007/0185917 A1 | 8/2007 | Prahlad et al. |
| 2007/0282595 A1 | 12/2007 | Tunning et al. |
| 2008/0015864 A1 | 1/2008 | Ross et al. |
| 2008/0021708 A1 | 1/2008 | Bennett et al. |
| 2008/0034032 A1 | 2/2008 | Healey et al. |
| 2008/0052063 A1 | 2/2008 | Bennett et al. |
| 2008/0120112 A1 | 5/2008 | Jordan et al. |
| 2008/0129520 A1 | 6/2008 | Lee |
| 2008/0140657 A1 | 6/2008 | Azvine et al. |
| 2008/0221903 A1 | 9/2008 | Kanevsky et al. |
| 2008/0228496 A1 | 9/2008 | Yu et al. |
| 2008/0247519 A1 | 10/2008 | Abella et al. |
| 2008/0249770 A1 | 10/2008 | Kim et al. |
| 2008/0300878 A1 | 12/2008 | Bennett |
| 2009/0006100 A1 | 1/2009 | Badger et al. |
| 2009/0006343 A1 | 1/2009 | Platt et al. |
| 2009/0030800 A1 | 1/2009 | Grois |
| 2009/0058823 A1 | 3/2009 | Kocienda |
| 2009/0076796 A1 | 3/2009 | Daraselia |
| 2009/0100049 A1 | 4/2009 | Cao |
| 2009/0112677 A1 | 4/2009 | Rhett |
| 2009/0150156 A1 | 6/2009 | Kennewick et al. |
| 2009/0157401 A1 | 6/2009 | Bennett |
| 2009/0164441 A1 | 6/2009 | Cheyer |
| 2009/0171664 A1 | 7/2009 | Kennewick et al. |
| 2009/0290718 A1 | 11/2009 | Kahn et al. |
| 2009/0299745 A1 | 12/2009 | Kennewick et al. |
| 2009/0299849 A1 | 12/2009 | Cao et al. |
| 2010/0005081 A1 | 1/2010 | Bennett |
| 2010/0023320 A1 | 1/2010 | Di Cristo et al. |
| 2010/0036660 A1 | 2/2010 | Bennett |
| 2010/0042400 A1 | 2/2010 | Block et al. |
| 2010/0088020 A1 | 4/2010 | Sano et al. |
| 2010/0145700 A1 | 6/2010 | Kennewick et al. |
| 2010/0204986 A1 | 8/2010 | Kennewick et al. |
| 2010/0217604 A1 | 8/2010 | Baldwin et al. |
| 2010/0228540 A1 | 9/2010 | Bennett |
| 2010/0235341 A1 | 9/2010 | Bennett |
| 2010/0257160 A1 | 10/2010 | Cao |
| 2010/0277579 A1 | 11/2010 | Cho et al. |
| 2010/0280983 A1 | 11/2010 | Cho et al. |
| 2010/0286985 A1 | 11/2010 | Kennewick et al. |
| 2010/0299142 A1 | 11/2010 | Freeman et al. |
| 2010/0312547 A1 | 12/2010 | van Os et al. |
| 2010/0318576 A1 | 12/2010 | Kim |
| 2010/0332235 A1 | 12/2010 | David |
| 2010/0332348 A1 | 12/2010 | Cao |
| 2011/0060807 A1 | 3/2011 | Martin et al. |
| 2011/0082688 A1 | 4/2011 | Kim et al. |
| 2011/0112827 A1 | 5/2011 | Kennewick et al. |
| 2011/0112921 A1 | 5/2011 | Kennewick et al. |
| 2011/0119049 A1 | 5/2011 | Ylonen |
| 2011/0125540 A1 | 5/2011 | Jang et al. |
| 2011/0130958 A1 | 6/2011 | Stahl et al. |
| 2011/0131036 A1 | 6/2011 | Di Cristo et al. |
| 2011/0131045 A1 | 6/2011 | Cristo et al. |
| 2011/0144999 A1 | 6/2011 | Jang et al. |
| 2011/0161076 A1 | 6/2011 | Davis et al. |

(56) References Cited

U.S. PATENT DOCUMENTS

| | | |
|---|---|---|
| 2011/0175810 A1 | 7/2011 | Markovic et al. |
| 2011/0184730 A1 | 7/2011 | LeBeau et al. |
| 2011/0218855 A1 | 9/2011 | Cao et al. |
| 2011/0231182 A1 | 9/2011 | Weider et al. |
| 2011/0231188 A1 | 9/2011 | Kennewick et al. |
| 2011/0264643 A1 | 10/2011 | Cao |
| 2011/0279368 A1 | 11/2011 | Klein et al. |
| 2011/0306426 A1 | 12/2011 | Novak et al. |
| 2012/0002820 A1 | 1/2012 | Leichter |
| 2012/0016678 A1 | 1/2012 | Gruber et al. |
| 2012/0020490 A1 | 1/2012 | Leichter |
| 2012/0022787 A1 | 1/2012 | LeBeau et al. |
| 2012/0022857 A1 | 1/2012 | Baldwin et al. |
| 2012/0022860 A1 | 1/2012 | Lloyd et al. |
| 2012/0022868 A1 | 1/2012 | LeBeau et al. |
| 2012/0022869 A1 | 1/2012 | Lloyd et al. |
| 2012/0022870 A1 | 1/2012 | Kristjansson et al. |
| 2012/0022874 A1 | 1/2012 | Lloyd et al. |
| 2012/0022876 A1 | 1/2012 | LeBeau et al. |
| 2012/0023088 A1 | 1/2012 | Cheng et al. |
| 2012/0034904 A1 | 2/2012 | LeBeau et al. |
| 2012/0035908 A1 | 2/2012 | LeBeau et al. |
| 2012/0035924 A1 | 2/2012 | Jitkoff et al. |
| 2012/0035931 A1 | 2/2012 | LeBeau et al. |
| 2012/0035932 A1 | 2/2012 | Jitkoff et al. |
| 2012/0042343 A1 | 2/2012 | Laligand et al. |
| 2012/0271676 A1 | 10/2012 | Aravamudan et al. |
| 2012/0311583 A1 | 12/2012 | Gruber et al. |

FOREIGN PATENT DOCUMENTS

| | | |
|---|---|---|
| EP | 0293259 A2 | 11/1988 |
| EP | 0313975 A2 | 5/1989 |
| EP | 0314908 A2 | 5/1989 |
| EP | 0327408 A2 | 8/1989 |
| EP | 0389271 A2 | 9/1990 |
| EP | 0411675 A2 | 2/1991 |
| EP | 0559349 A1 | 9/1993 |
| EP | 0559349 B1 | 9/1993 |
| EP | 0570660 A1 | 11/1993 |
| EP | 1245023 A1 | 10/2002 |
| JP | 06 019965 | 1/1994 |
| JP | 2001 125896 | 5/2001 |
| JP | 2002 024212 | 1/2002 |
| JP | 2003517158 A | 5/2003 |
| JP | 2009 036999 | 2/2009 |
| KR | 10-0776800 B1 | 11/2007 |
| KR | 10-0810500 B1 | 3/2008 |
| KR | 10 2008 109322 A | 12/2008 |
| KR | 10 2009 086805 A | 8/2009 |
| KR | 10-0920267 B1 | 10/2009 |
| KR | 10 2011 0113414 A | 10/2011 |
| WO | WO 2006/129967 A1 | 12/2006 |
| WO | WO 2011/088053 A2 | 7/2011 |

OTHER PUBLICATIONS

Martin, D., et al., "The Open Agent Architecture: a Framework for building distributed software systems," Jan.-Mar. 1999, Applied Artificial Intelligence: an International Journal, vol. 13, No. 1-2, http://adam.cheyer.com/papers/oaa.pdf, 38 pages.

Alfred App, 2011, http://www.alfredapp.com/, 5 pages.

Ambite, JL., et al., "Design and Implementation of the CALO Query Manager," Copyright © 2006, American Association for Artificial Intelligence, (www.aaai.org), 8 pages.

Ambite, JL., et al., "Integration of Heterogeneous Knowledge Sources in the CALO Query Manager," 2005, The 4th International Conference on Ontologies, DataBases, and Applications of Semantics (ODBASE), Agia Napa, Cyprus, ttp://www.isi.edu/people/ambite/publications/integration_heterogeneous_knowledge_sources_calo_query_manager, 18 pages.

Belvin, R. et al., "Development of the HRL Route Navigation Dialogue System," 2001, in Proceedings of the First International Conference on Human Language Technology Research, Paper, Copyright © 2001 HRL Laboratories, LLC, http://citeseerx.ist.psu.edu/viewdoc/sunnmary?doi=10.1.1.10.6538, 5 pages.

Berry, P. M., et al. "PTIME: Personalized Assistance for Calendaring," ACM Transactions on Intelligent Systems and Technology, vol. 2, No. 4, Article 40, Publication date: Jul. 2011, 40:1-22, 22 pages.

Butcher, M., "EVI arrives in town to go toe-to-toe with Siri," Jan. 23, 2012, http://techcrunch.com/2012/01/23/evi-arrives-in-town-to-go-toe-to-toe-with-siri/, 2 pages.

Chen, Y., "Multimedia Siri Finds and Plays Whatever You Ask for," Feb. 9, 2012, http://www.psfk.com/2012/02/multimedia-siri.html, 9 pages.

Cheyer, A. et al., "Spoken Language and Multimodal Applications for Electronic Realties," © Springer-Verlag London Ltd, Virtual Reality 1999, 3:1-15, 15 pages.

Cutkosky, M. R. et al., "PACT: An Experiment in Integrating Concurrent Engineering Systems," Journal, Computer, vol. 26 Issue 1, Jan. 1993, IEEE Computer Society Press Los Alamitos, CA, USA, http://dl.acm.org/citation.cfm?id=165320, 14 pages.

Elio, R. et al., "On Abstract Task Models and Conversation Policies," http://webdocs.cs.ualberta.ca/~ree/publications/papers2/Ats.AA99.pdf, 10 pages.

Ericsson, S. et al., "Software illustrating a unified approach to multimodality and multilinguality in the in-home domain," Dec. 22, 2006, Talk and Look: Tools for Ambient Linguistic Knowledge, http://www.talk-project.eurice.eu/fileadmin/talk/publications_public/deliverables_public/D1_6.pdf, 127 pages.

Evi, "Meet Evi: the one mobile app that provides solutions for your everyday problems," Feb. 8, 2012, http://www.evi.com/, 3 pages.

Feigenbaum, E., et al., "Computer-assisted Semantic Annotation of Scientific Life Works," 2007, http://tomgruber.org/writing/stanford-cs300.pdf, 22 pages.

Gannes, L., "Alfred App Gives Personalized Restaurant Recommendations," allthingsd.com, Jul. 18, 2011, http://allthingsd.com/20110718/alfred-app-gives-personalized-restaurant-recommendations/, 3 pages.

Gautier, P. O., et al. "Generating Explanations of Device Behavior Using Compositional Modeling and Causal Ordering," 1993, http://citeseerx.ist.psu.edu/viewdoc/summary?doi=10.1.1.42.8394, 9 pages.

Gervasio, M. T., et al., Active Preference Learning for Personalized Calendar Scheduling Assistancae, Copyright © 2005, http://www.ai.sri.com/~gervasio/pubs/gervasio-iui05.pdf, 8 pages.

Glass, A., "Explaining Preference Learning," 2006, http://cs229.stanford.edu/proj2006/Glass-ExplainingPreferenceLearning.pdf, 5 pages.

Gruber, T. R., et al., "An Ontology for Engineering Mathematics," in Jon Doyle, Piero Torasso, & Erik Sandewall, Eds., Fourth International Conference on Principles of Knowledge Representation and Reasoning, Gustav Stresemann Institut, Bonn, Germany, Morgan Kaufmann, 1994, http://www-ksl.stanford.edu/knowledge-sharing/papers/engmath.html, 22 pages.

Gruber, T. R., "A Translation Approach to Portable Ontology Specifications," Knowledge Systems Laboratory, Stanford University, Sep. 1992, Technical Report KSL 92-71, Revised Apr. 1993, 27 pages.

Gruber, T. R., "Automated Knowledge Acquisition for Strategic Knowledge," Knowledge Systems Laboratory, Machine Learning, 4, 293-336 (1989), 44 pages.

Gruber, T. R., "(Avoiding) the Travesty of the Commons," Presentation at NPUC 2006, New Paradigms for User Computing, IBM Almaden Research Center, Jul. 24, 2006. http://tomgruber.org/writing/avoiding-travestry.htm, 52 pages.

Gruber, T. R., "Big Think Small Screen: How semantic computing in the cloud will revolutionize the consumer experience on the phone," Keynote presentation at Web 3.0 conference, Jan. 27, 2010, http://tomgruber.org/writing/web30jan2010.htm, 41 pages.

Gruber, T. R., "Collaborating around Shared Content on the WWW," W3C Workshop on WWW and Collaboration, Cambridge, MA, Sep. 11, 1995, http://www.w3.org/Collaboration/Workshop/Proceedings/P9.html, 1 page.

Gruber, T. R., "Collective Knowledge Systems: Where the Social Web meets the Semantic Web," Web Semantics: Science, Services

(56) References Cited

OTHER PUBLICATIONS and Agents on the World Wide Web (2007), doi:10.1016/j.websem. 2007.11.011, keynote presentation given at the 5th International Semantic Web Conference, Nov. 7, 2006, 19 pages.

Gruber, T. R., "Where the Social Web meets the Semantic Web," Presentation at the 5th International Semantic Web Conference, Nov. 7, 2006, 38 pages.

Gruber, T. R., "Despite our Best Efforts, Ontologies are not the Problem," AAAI Spring Symposium, Mar. 2008, http://tomgruber.org/writing/aaai-ss08.htm, 40 pages.

Gruber, T. R., "Enterprise Collaboration Management with Intraspect," Intraspect Software, Inc., Instraspect Technical White Paper Jul. 2001, 24 pages.

Gruber, T. R., "Every ontology is a treaty—a social agreement—among people with some common motive in sharing," Interview by Dr. Miltiadis D. Lytras, Official Quarterly Bulletin of AIS Special Interest Group on Semantic Web and Information Systems, vol. 1, Issue 3, 2004, http://www.sigsemis.org 1, 5 pages.

Gruber, T. R., et al., "Generative Design Rationale: Beyond the Record and Replay Paradigm," Knowledge Systems Laboratory, Stanford University, Dec. 1991, Technical Report KSL 92-59, Updated Feb. 1993, 24 pages.

Gruber, T. R., "Helping Organizations Collaborate, Communicate, and Learn," Presentation to NASA Ames Research, Mountain View, CA, Mar. 2003, http://tomgruber.org/writing/organizational-intelligence-talk.htm, 30 pages.

Gruber, T. R., "Intelligence at the Interface: Semantic Technology and the Consumer Internet Experience," Presentation at Semantic Technologies conference (SemTech08), May 20, 2008, http://tomgruber.org/writing.htm, 40 pages.

Gruber, T. R., Interactive Acquisition of Justifications: Learning "Why" by Being Told "What" Knowledge Systems Laboratory, Stanford University, Oct. 1990, Technical Report KSL 91-17, Revised Feb. 1991, 24 pages.

Gruber, T. R., "It Is What It Does: the Pragmatics of Ontology for Knowledge Sharing," (c) 2000, 2003, http://www.cidoc-crm.org/docs/symposium_presentations/gruber_cidoc-ontology-2003.pdf, 21 pages.

Gruber, T. R., et al., "Machine-generated Explanations of Engineering Models: A Compositional Modeling Approach," (1993) in Proc. International Joint Conference on Artificial Intelligence, http://citeseerx.ist.psu.edu/viewdoc/sunnmary?doi=10.1.1.34.930, 7 pages.

Gruber, T. R., "2021: Mass Collaboration and the Really New Economy," TNTY Futures, the newsletter of the Next Twenty Years series, vol. 1, Issue 6, Aug. 2001, http://www.tnty.com/newsletter/futures/archive/v01-05business.html, 5 pages.

Gruber, T. R., et al.,"NIKE: A National Infrastructure for Knowledge Exchange," Oct. 1994, http://www.eit.com/papers/nike/nike.html and nike.ps, 10 pages.

Gruber, T. R., "Ontologies, Web 2.0 and Beyond," Apr. 24, 2007, Ontology Summit 2007, http://tomgruber.org/writing/ontolog-social-web-keynote.pdf, 17 pages.

Gruber, T. R., "Ontology of Folksonomy: A Mash-up of Apples and Oranges," Originally published to the web in 2005, Int'l Journal on Semantic Web & Information Systems, 3(2), 2007, 7 pages.

Gruber, T. R., "Siri, a Virtual Personal Assistant—Bringing Intelligence to the Interface," Jun. 16, 2009, Keynote presentation at Semantic Technologies conference, Jun. 2009. http://tomgruber.org/writing/semtech09.htm, 22 pages.

Gruber, T. R., "TagOntology," Presentation to Tag Camp, www.tagcamp.org, Oct. 29, 2005, 20 pages.

Gruber, T. R., et al., "Toward a Knowledge Medium for Collaborative Product Development," in Artificial Intelligence in Design 1992, from Proceedings of the Second International Conference on Artificial Intelligence in Design, Pittsburgh, USA, Jun. 22-25, 1992, 19 pages.

Gruber, T. R., "Toward Principles for the Design of Ontologies Used for Knowledge Sharing," in International Journal Human-Computer Studies 43, p. 907-928, substantial revision of paper presented at the International Workshop on Formal Ontology, Mar. 1993, Padova, Italy, available as Technical Report KSL 93-04, Knowledge Systems Laboratory, Stanford University, further revised Aug. 23, 1993, 23 pages.

Guzzoni, D., et al., "Active, A Platform for Building Intelligent Operating Rooms," Surgetica 2007 Computer-Aided Medical Interventions: tools and applications, pp. 191-198, Paris, 2007, Sauramps Médical, http://lsro.epfl.ch/page-68384-en.html, 8 pages.

Guzzoni, D., et al., "Active, A Tool for Building Intelligent User Interfaces," ASC 2007, Palma de Mallorca, http://lsro.epfl.ch/page-34241.html, 6 pages.

Guzzoni, D., et al., "Modeling Human-Agent Interaction with Active Ontologies," 2007, AAAI Spring Symposium, Interaction Challenges for Intelligent Assistants, Stanford University, Palo Alto, California, 8 pages.

Hardawar, D., "Driving app Waze builds its own Sid for hands-free voice control," Feb. 9, 2012, http://venturebeat.com/2012/02/09/driving-app-waze-builds-its-own-siri-for-hands-free-voice-control/, 4 pages.

Intraspect Software, "The Intraspect Knowledge Management Solution: Technical Overview," http://tomgruber.org/writing/intraspect-whitepaper-1998.pdf, 18 pages.

Julia, L., et al., Un éditeur interactif de tableaux dessinés à main levée (an Interactive Editor for Hand-Sketched Tables), Traitement du Signal 1995, vol. 12, No. 6, 8 pages. No English Translation Available.

Karp, P. D., "A Generic Knowledge-Base Access Protocol," May 12, 1994, http://lecture.cs.buu.ac.th/~f50353/Document/gfp.pdf, 66 pages.

Lemon, O., et al., "Multithreaded Context for Robust Conversational Interfaces: Context-Sensitive Speech Recognition and Interpretation of Corrective Fragments," Sep. 2004, ACM Transactions on Computer-Human Interaction, vol. 11, No. 3, 27 pages.

Leong, L., et al., "CASIS: A Context-Aware Speech Interface System," IUI'05, Jan. 9-12, 2005, Proceedings of the 10th international conference on Intelligent user interfaces, San Diego, California, USA, 8 pages.

Lieberman, H., et al., "Out of context: Computer systems that adapt to, and learn from, context," 2000, IBM Systems Journal, vol. 39, Nos. 3/4, 2000, 16 pages.

Lin, B., et al., "A Distributed Architecture for Cooperative Spoken Dialogue Agents with Coherent Dialogue State and History," 1999, http://citeseerx.ist.psu.edu/viewdoc/summary?doi=10.1.1.42.272, 4 pages.

McGuire, J., et al., "SHADE: Technology for Knowledge-Based Collaborative Engineering," 1993, Journal of Concurrent Engineering: Applications and Research (CERA), 18 pages.

Milward, D., et al., "D2.2: Dynamic Multimodal Interface Reconfiguration," Talk and Look: Tools for Ambient Linguistic Knowledge, Aug. 8, 2006, http://www.ihmc.us/users/nblaylock/Pubs/Files/talk_d2.2.pdf, 69 pages.

Mitra, P., et al., "A Graph-Oriented Model for Articulation of Ontology Interdependencies," 2000, http://ilpubs.stanford.edu:8090/442/1/2000-20.pdf, 15 pages.

Moran, D. B., et al., "Multimodal User Interfaces in the Open Agent Architecture," Proc. of the 1997 International Conference on Intelligent User Interfaces (IUI97), 8 pages.

Mozer, M., "An Intelligent Environment Must be Adaptive," Mar./Apr. 1999, IEEE Intelligent Systems, 3 pages.

Mühlhäuser, M., "Context Aware Voice User Interfaces for Workflow Support," Darmstadt 2007, http://tuprints.ulb.tu-darmstadt.de/876/1/PhD.pdf, 254 pages.

Naone, E., "TR10: Intelligent Software Assistant," Mar.-Apr. 2009, Technology Review, http://www.technologyreview.com/printer_friendly_article.aspx?id=22117, 2 pages.

Neches, R., "Enabling Technology for Knowledge Sharing," Fall 1991, AI Magazine, pp. 37-56, (21 pages).

Nöth, E., et al., "Verbmobil: The Use of Prosody in the Linguistic Components of a Speech Understanding System," IEEE Transactions on Speech and Audio Processing, vol. 8, No. 5, Sep. 2000, 14 pages.

Rice, J., et al., "Monthly Program: Nov. 14, 1995," The San Francisco Bay Area Chapter of ACM SIGCHI, http://www.baychi.org/calendar/19951114/, 2 pages.

(56) References Cited

OTHER PUBLICATIONS

Rice, J., et al., "Using the Web Instead of a Window System," Knowledge Systems Laboratory, Stanford University, http://tomgruber.org/writing/ksl-95-69.pdf, 14 pages.

Rivlin, Z., et al., "Maestro: Conductor of Multimedia Analysis Technologies," 1999 SRI International, Communications of the Association for Computing Machinery (CACM), 7 pages.

Sheth, A., et al., "Relationships at the Heart of Semantic Web: Modeling, Discovering, and Exploiting Complex Semantic Relationships," Oct. 13, 2002, Enhancing the Power of the Internet: Studies in Fuzziness and Soft Computing, SpringerVerlag, 38 pages.

Simonite, T., "One Easy Way to Make Sid Smarter," Oct. 18, 2011, Technology Review, http:// www.technologyreview.com/printer_friendly_article.aspx?id=38915, 2 pages.

Stent, A., et al., "The CommandTalk Spoken Dialogue System," 1999, http://acl.ldc.upenn.edu/P/P99/P99-1024.pdf, 8 pages.

Tofel, K., et al., "SpeakToIt: A personal assistant for older iPhones, iPads," Feb. 9, 2012, http://gigaom.com/apple/speaktoit-siri-for-older-iphones-ipads/, 7 pages.

Tucker, J., "Too lazy to grab your TV remote? Use Siri instead," Nov. 30, 2011, http://www.engadget.com/2011/11/30/too-lazy-to-grab-your-tv-remote-use-siri-instead/, 8 pages.

Tur, G., et al., "The CALO Meeting Speech Recognition and Understanding System," 2008, Proc. IEEE Spoken Language Technology Workshop, 4 pages.

Tur, G., et al., "The-CALO-Meeting-Assistant System," IEEE Transactions on Audio, Speech, and Language Processing, vol. 18, No. 6, Aug. 2010, 11 pages.

Vlingo, "Vlingo Launches Voice Enablement Application on Apple App Store," Vlingo press release dated Dec. 3, 2008, 2 pages.

YouTube, "Knowledge Navigator," 5:34 minute video uploaded to YouTube by Knownav on Apr. 29, 2008, http://www.youtube.com/watch?v=QRH8eimU_20on Aug. 3, 2006, 1 page.

YouTube,"Send Text, Listen to and Send E-Mail 'By Voice' www.voiceassist.com," 2:11 minute video uploaded to YouTube by VoiceAssist on Jul. 30, 2009, http://www.youtube.com/watch?v=0tEU61nHHA4, 1 page.

YouTube,"Text'nDrive App Demo—Listen and Reply to your Messages by Voice while Driving!," 1:57 minute video uploaded to YouTube by TextnDrive on Apr 27, 2010, http://www.youtube.com/watch?v=WaGfzoHsAMw, 1 page.

YouTube, "Voice on the Go (BlackBerry)," 2:51 minute video uploaded to YouTube by VoiceOnTheGo on Jul. 27, 2009, http://www.youtube.com/watch?v=pJqpWgQS98w, 1 page.

International Search Report and Written Opinion dated Nov. 29, 2011, received in International Application No. PCT/US2011/20861, which corresponds to U.S. Appl. No. 12/987,982, 15 pages. (Thomas Robert Gruber).

Glass, J., et al., "Multiple Spoken-Language Understanding in the MIT Voyager System," Aug. 1995, http://groups.csail.mit.edu/sls/publications/1995/speechcomm95-voyager.pdf, 29 pages.

Goddeau, D., et al., "A Form-Based Dialogue Manager for Spoken Language Applications," Oct. 1996, http://phasedance.com/pdf/icslp96.pdf, 4 pages.

Goddeau, D., et al., "Galaxy: A Human-Language Interface to On-Line Travel Information," 1994 International Conference on Spoken Language Processing, Sep. 18-22, 1994, Pacific Convention Plaza Yokohama, Japan, 6 pages.

Meng, H., et al., "Wheels: A Conversational System in the Automobile Classified Domain," Oct. 1996, httphttp://citeseerx.ist.psu.edu/viewdocs/summary?doi=10.1.1.16.3022, 4 pages.

Phoenix Solutions, Inc. v. West Interactive Corp., Document 40, Declaration of Christopher Schmandt Regarding the MIT Galaxy System dated Jul. 2, 2010, 162 pages.

Seneff, S., et al., "A New Restaurant Guide Conversational System: Issues in Rapid Protyping for Specialized Domains," Oct. 1996, citeseerx.ist.psu.edu.viewdoc.download?doi=10.1.1.16...rep..., 4 pages.

Vlingo InCar, "Distracted Driving Solution with Vlingo InCar," 2:38 minute video uploaded to YouTube by Vlingo Voice on Oct. 6, 2010, http://www.youtube.com/watch?v=Vqs8XfXxgz4, 2 pages.

Zue, V., "Conversational Interfaces: Adbances and Challenges, " Sep. 1997, http://www.cs.cmu.edu/~dod/papers.zue97.pdf, 10 pages.

Zue, V. W., "Toward Systems that Understand Spoken Language," Feb. 1994, ARPA Strategic Computing Institute, © 1994 IEEE, 9 pages.

Bussler, C., et al., "Web Service Execution Environment (WSMX)," Jun. 3, 2005, W3C Member Submission, http://www.w3.org/Submission/WSMX, 29 pages.

Cheyer, A., "About Adam Cheyer," Sep. 17, 2012, http://www.adam.cheyer.com/about.html, 2 pages.

Cheyer, ., "A Perspective on AI & Agent Technologies for SCM," VerticalNet, 2001 presentation, 22 pages.

Domingue, J., et al., "Web Service Modeling Ontology (WSMO)—An Ontology for Semantic Web Services," Jun. 9-10, 2005, position paper at the W3C Workshop on Frameworks for Semantics in Web Services, Innsbruck, Austria, 6 pages.

Guzzoni, D., et al., "A Unified Platform for Building Intelligent Web Interaction Assistants," Proceedings of the 2006 IEEE/WIC/ACM International Conference on Web Intelligence and Intelligent Agent Technology, Computer Society, 4 pages.

Roddy, D., et al., "Communication and Collaboration in a Landscape of B2B eMarketplaces," VerticalNet Solutions, white paper, Jun. 15, 2000, 23 pages.

Acero, A., et al., "Environmental Robustness in Automatic Speech Recognition," International Conference on Acoustics, Speech, and Signal Processing (ICASSP'90), Apr. 3-6, 1990, 4 pages.

Acero, A., et al., "Robust Speech Recognition by Normalization of the Acoustic Space," International Conference on Acoustics, Speech, and Signal Processing, 1991, 4 pages.

Ahlbom, G., et al., "Modeling Spectral Speech Transitions Using Temporal Decomposition Techniques," IEEE International Conference of Acoustics, Speech, and Signal Processing (ICASSP'87), Apr. 1987, vol. 12, 4 pages.

Aikawa, K., "Speech Recognition Using Time-Warping Neural Networks," Proceedings of the 1991 IEEE Workshop on Neural Networks for Signal Processing, Sep. 30 to Oct. 1, 1991, 10 pages.

Anastasakos, A., et al., "Duration Modeling in Large Vocabulary Speech Recognition," International Conference on Acoustics, Speech, and Signal Processing (ICASSP'95), May 9-12, 1995, 4 pages.

Anderson, R. H., "Syntax-Directed Recognition of Hand-Printed Two-Dimensional Mathematics," in Proceedings of Symposium on Interactive Systems for Experimental Applied Mathematics: Proceedings of the Association for Computing Machinery Inc. Symposium, © 1967, 12 pages.

Ansari, R., et al., "Pitch Modification of Speech using a Low-Sensitivity Inverse Filter Approach," IEEE Signal Processing Letters, vol. 5, No. 3, Mar. 1998, 3 pages.

Anthony, N. J., et al., "Supervised Adaption for Signature Verification System," Jun. 1, 1978, IBM Technical Disclosure, 3 pages.

Apple Computer, "Guide Maker User's Guide," © Apple Computer, Inc., Apr. 27, 1994, 8 pages.

Apple Computer, "Introduction to Apple Guide," © Apple Computer, Inc., Apr. 28, 1994, 20 pages.

Asanović, K., et al., "Experimental Determination of Precision Requirements for Back-Propagation Training of Artificial Neural Networks," in Proceedings of the 2nd International Conference of Microelectronics for Neural Networks, 1991, www.ICSI.Berkeley.EDU, 7 pages.

Atal, B. S., "Efficient Coding of LPC Parameters by Temporal Decomposition," IEEE International Conference on Acoustics, Speech, and Signal Processing (ICASSP'83), Apr. 1983, 4 pages.

Bahl, L. R., et al., "Acoustic Markov Models Used in the Tangora Speech Recognition System," in Proceeding of International Conference on Acoustics, Speech, and Signal Processing (ICASSP'88), Apr. 11-14, 1988, vol. 1, 4 pages.

Bahl, L. R., et al., "A Maximum Likelihood Approach to Continuous Speech Recognition," IEEE Transaction on Pattern Analysis and Machine Intelligence, vol. PAMI-5, No. 2, Mar. 1983, 13 pages.

(56) References Cited

OTHER PUBLICATIONS

Bahl, L. R., et al., "A Tree-Based Statistical Language Model for Natural Language Speech Recognition," IEEE Transactions on Acoustics, Speech and Signal Processing, vol. 37, Issue 7, Jul. 1989, 8 pages.
Bahl, L. R., et al., "Large Vocabulary Natural Language Continuous Speech Recognition," in Proceedings of 1989 International Conference on Acoustics, Speech, and Signal Processing, May 23-26, 1989, vol. 1, 6 pages.
Bahl, L. R., et al, "Multonic Markov Word Models for Large Vocabulary Continuous Speech Recognition," IEEE Transactions on Speech and Audio Processing, vol. 1, No. 3, Jul. 1993, 11 pages.
Bahl, L. R., et al., "Speech Recognition with Continuous-Parameter Hidden Markov Models," in Proceeding of International Conference on Acoustics, Speech, and Signal Processing (ICASSP'88), Apr. 11-14, 1988, vol. 1, 8 pages.
Banbrook, M., "Nonlinear Analysis of Speech from a Synthesis Perspective," A thesis submitted for the degree of Doctor of Philosophy, The University of Edinburgh, Oct. 15, 1996, 35 pages.
Belaid, A., et al., "A Syntactic Approach for Handwritten Mathematical Formula Recognition," IEEE Transactions on Pattern Analysis and Machine Intelligence, vol. PAMI-6, No. 1, Jan. 1984, 7 pages.
Bellegarda, E. J., et al., "On-Line Handwriting Recognition Using Statistical Mixtures," Advances in Handwriting and Drawings: A Multidisciplinary Approach, Europia, 6th International IGS Conference on Handwriting and Drawing, Paris—France, Jul. 1993, 11 pages.
Bellegarda, J. R., "A Latent Semantic Analysis Framework for Large-Span Language Modeling," 5th European Conference on Speech, Communication and Technology, (EUROSPEECH'97), Sep. 22-25, 1997, 4 pages.
Bellegarda, J. R., "A Multispan Language Modeling Framework for Large Vocabulary Speech Recognition," IEEE Transactions on Speech and Audio Processing, vol. 6, No. 5, Sep. 1998, 12 pages.
Bellegarda, J. R., et al., "A Novel Word Clustering Algorithm Based on Latent Semantic Analysis," in Proceedings of the IEEE International Conference on Acoustics, Speech, and Signal Processing (ICASSP'96), vol. 1, 4 pages.
Bellegarda, J. R., et al., "Experiments Using Data Augmentation for Speaker Adaptation," International Conference on Acoustics, Speech, and Signal Processing (ICASSP'95), May 9-12, 1995, 4 pages.
Bellegarda, J. R., "Exploiting Both Local and Global Constraints for Multi-Span Statistical Language Modeling," Proceeding of the 1998 IEEE International Conference on Acoustics, Speech, and Signal Processing (ICASSP'98), vol. 2, May 12-15, 1998, 5 pages.
Bellegarda, J. R., "Exploiting Latent Semantic Information in Statistical Language Modeling," in Proceedings of the IEEE, Aug. 2000, vol. 88, No. 8, 18 pages.
Bellegarda, J. R., "Interaction-Driven Speech Input—A Data-Driven Approach to the Capture of Both Local and Global Language Constraints," 1992, 7 pages, available at http://old.sigchi.org/bulletin/1998.2/bellegarda.html.
Bellegarda, J. R., "Large Vocabulary Speech Recognition with Multispan Statistical Language Models," IEEE Transactions on Speech and Audio Processing, vol. 8, No. 1, Jan. 2000, 9 pages.
Bellegarda, J. R., et al., "Performance of the IBM Large Vocabulary Continuous Speech Recognition System on the ARPA Wall Street Journal Task," Signal Processing VII: Theories and Applications, © 1994 European Association for Signal Processing, 4 pages.
Bellegarda, J. R., et al., "The Metamorphic Algorithm: A Speaker Mapping Approach to Data Augmentation," IEEE Transactions on Speech and Audio Processing, vol. 2, No. 3, Jul. 1994, 8 pages.
Black, A. W., et al., "Automatically Clustering Similar Units for Unit Selection in Speech Synthesis," in Proceedings of Eurospeech 1997, vol. 2, 4 pages.
Blair, D. C., et al., "An Evaluation of Retrieval Effectiveness for a Full-Text Document-Retrieval System," Communications of the ACM, vol. 28, No. 3, Mar. 1985, 11 pages.
Briner, L. L., "Identifying Keywords in Text Data Processing," in Zelkowitz, Marvin V., ED, Directions and Challenges,15th Annual Technical Symposium, Jun. 17, 1976, Gaithersbury, Maryland, 7 pages.
Bulyko, I., et al., "Joint Prosody Prediction and Unit Selection for Concatenative Speech Synthesis," Electrical Engineering Department, University of Washington, Seattle, 2001, 4 pages.
Bussey, H. E., et al., "Service Architecture, Prototype Description, and Network Implications of a Personalized Information Grazing Service," INFOCOM'90, Ninth Annual Joint Conference of the IEEE Computer and Communication Societies, Jun. 3-7, 1990, http://slrohall.com/publications/, 8 pages.
Buzo, A., et al., "Speech Coding Based Upon Vector Quantization," IEEE Transactions on Acoustics, Speech, and Signal Processing, vol. Assp-28, No. 5, Oct. 1980, 13 pages.
Caminero-Gil, J., et al., "Data-Driven Discourse Modeling for Semantic Interpretation," in Proceedings of the IEEE International Conference on Acoustics, Speech, and Signal Processing, May 7-10, 1996, 6 pages.
Cawley, G. C., "The Application of Neural Networks to Phonetic Modelling," PhD Thesis, University of Essex, Mar. 1996, 13 pages.
Chang, S., et al., "A Segment-based Speech Recognition System for Isolated Mandarin Syllables," Proceedings TENCON '93, IEEE Region 10 conference on Computer, Communication, Control and Power Engineering, Oct. 19-21, 1993, vol. 3, 6 pages.
Conklin, J., "Hypertext: An Introduction and Survey," Computer Magazine, Sep. 1987, 25 pages.
Connolly, F. T., et al., "Fast Algorithms for Complex Matrix Multiplication Using Surrogates," IEEE Transactions on Acoustics, Speech, and Signal Processing, Jun. 1989, vol. 37, No. 6, 13 pages.
Deerwester, S., et al., "Indexing by Latent Semantic Analysis," Journal of the American Society for Information Science, vol. 41, No. 6, Sep. 1990, 19 pages.
Deller, Jr., J. R., et al., "Discrete-Time Processing of Speech Signals," © 1987 Prentice Hall, ISBN: 0-02-328301-7, 14 pages.
Digital Equipment Corporation, "Open VMS Software Overview," Dec. 1995, software manual, 159 pages.
Donovan, R. E., "A New Distance Measure for Costing Spectral Discontinuities in Concatenative Speech Synthesisers," 2001, http://citeseerx.ist.psu.edu/viewdoc/summary?doi=10.1.1.21.6398, 4 pages.
Frisse, M. E., "Searching for Information in a Hypertext Medical Handbook," Communications of the ACM, vol. 31, No. 7, Jul. 1988, 8 pages.
Goldberg, D., et al., "Using Collaborative Filtering to Weave an Information Tapestry," Communications of the ACM, vol. 35, No. 12, Dec. 1992, 10 pages.
Gorin, A. L., et al., "On Adaptive Acquisition of Language," International Conference on Acoustics, Speech, and Signal Processing (ICASSP'90), vol. 1, Apr. 3-6, 1990, 5 pages.
Gotoh, Y., et al., "Document Space Models Using Latent Semantic Analysis," in Proceedings of Eurospeech, 1997, 4 pages.
Gray, R. M., "Vector Quantization," IEEE ASSP Magazine, Apr. 1984, 26 pages.
Harris, F. J., "On the Use of Windows for Harmonic Analysis with the Discrete Fourier Transform," in Proceedings of the IEEE, vol. 66, No. 1, Jan. 1978, 34 pages.
Helm, R., et al., "Building Visual Language Parsers," in Proceedings of CHI'91 Proceedings of the SIGCHI Conference on Human Factors in Computing Systems, 8 pages.
Hermansky, H., "Perceptual Linear Predictive (PLP) Analysis of Speech," Journal of the Acoustical Society of America, vol. 87, No. 4, Apr. 1990, 15 pages.
Hermansky, H., "Recognition of Speech in Additive and Convolutional Noise Based on Rasta Spectral Processing," in proceedings of IEEE International Conference on Acoustics, speech, and Signal Processing (ICASSP'93), Apr. 27-30, 1993, 4 pages.
Hoehfeld M., et al., "Learning with Limited Numerical Precision Using the Cascade-Correlation Algorithm," IEEE Transactions on Neural Networks, vol. 3, No. 4, Jul. 1992, 18 pages.

(56) References Cited

OTHER PUBLICATIONS

Holmes, J. N., "Speech Synthesis and Recognition—Stochastic Models for Word Recognition," Speech Synthesis and Recognition, Published by Chapman & Hall, London, ISBN 0 412 53430 4, © 1998 J. N. Holmes, 7 pages.

Hon, H.W., et al., "CMU Robust Vocabulary-Independent Speech Recognition System," IEEE International Conference on Acoustics, Speech, and Signal Processing (ICASSP-91), Apr. 14-17, 1991, 4 pages.

IBM Technical Disclosure Bulletin, "Speech Editor," vol. 29, No. 10, Mar. 10, 1987, 3 pages.

IBM Technical Disclosure Bulletin, "Integrated Audio-Graphics User Interface," vol. 33, No. 11, Apr. 1991, 4 pages.

IBM Technical Disclosure Bulletin, "Speech Recognition with Hidden Markov Models of Speech Waveforms," vol. 34, No. 1, Jun. 1991, 10 pages.

Iowegian International, "FIR Filter Properties," dspGuro, Digital Signal Processing Central, http://www.dspguru.com/dsp/tags/fir/properties, downloaded on Jul. 28, 2010, 6 pages.

Jacobs, P. S., et al., "Scisor: Extracting Information from On-Line News," Communications of the ACM, vol. 33, No. 11, Nov. 1990, 10 pages.

Jelinek, F., "Self-Organized Language Modeling for Speech Recognition," Readings in Speech Recognition, edited by Alex Waibel and Kai-Fu Lee, May 15, 1990, © 1990 Morgan Kaufmann Publishers, Inc., ISBN: 1-55860-124-4, 63 pages.

Jennings, A., et al., "A Personal News Service Based on a User Model Neural Network," IEICE Transactions on Information and Systems, vol. E75-D, No. 2, Mar. 1992, Tokyo, JP, 12 pages.

Ji, T., et al., "A Method for Chinese Syllables Recognition based upon Sub-syllable Hidden Markov Model," 1994 International Symposium on Speech, Image Processing and Neural Networks, Apr. 13-16, 1994, Hong Kong, 4 pages.

Jones, J., "Speech Recognition for Cyclone," Apple Computer, Inc., E.R.S., Revision 2.9, Sep. 10, 1992, 93 pages.

Katz, S. M., "Estimation of Probabilities from Sparse Data for the Language Model Component of a Speech Recognizer," IEEE Transactions on Acoustics, Speech, and Signal Processing, vol. ASSP-35, No. 3, Mar. 1987, 3 pages.

Kitano, H., "PhiDM-Dialog, an Experimental Speech-to-Speech Dialog Translation System," Jun. 1991 Computer, vol. 24, No. 6, 13 pages.

Klabbers, E., et al., "Reducing Audible Spectral Discontinuities," IEEE Transactions on Speech and Audio Processing, vol. 9, No. 1, Jan. 2001, 13 pages.

Klatt, D. H., "Linguistic Uses of Segmental Duration in English: Acoustic and Perpetual Evidence," Journal of the Acoustical Society of America, vol. 59, No. 5, May 1976, 16 pages.

Kominek, J., et al., "Impact of Durational Outlier Removal from Unit Selection Catalogs," 5th ISCA Speech Synthesis Workshop, Jun. 14-16, 2004, 6 pages.

Kubala, F., et al., "Speaker Adaptation from a Speaker-Independent Training Corpus," International Conference on Acoustics, Speech, and Signal Processing (ICASSP'90), Apr. 3-6, 1990, 4 pages.

Kubala, F., et al., "The Hub and Spoke Paradigm for CSR Evaluation," Proceedings of the Spoken Language Technology Workshop, Mar. 6-8, 1994, 9 pages.

Lee, K.F., "Large-Vocabulary Speaker-Independent Continuous Speech Recognition: The SPHINX System," Apr. 18, 1988, Partial fulfillment of the requirements for the degree of Doctor of Philosophy, Computer Science Department, Carnegie Mellon University, 195 pages.

Lee, L., et al., "A Real-Time Mandarin Dictation Machine for Chinese Language with Unlimited Texts and Very Large Vocabulary," International Conference on Acoustics, Speech and Signal Processing, vol. 1, Apr. 3-6, 1990, 5 pages.

Lee, L, et al., "Golden Mandarin(II)—An Improved Single-Chip Real-Time Mandarin Dictation Machine for Chinese Language with Very Large Vocabulary," 0/7803-0946-4/93 © 1993IEEE, 4 pages.

Lee, L., et al., "Golden Mandarin(II)—An Intelligent Mandarin Dictation Machine for Chinese Character Input with Adaptation/Learning Functions," International Symposium on Speech, Image Processing and Neural Networks, Apr. 13-16, 1994, Hong Kong, 5 pages.

Lee, L., et al., "System Description of Golden Mandarin (I) Voice Input for Unlimited Chinese Characters," International Conference on Computer Processing of Chinese & Oriental Languages, vol. 5, Nos. 3 & 4, Nov. 1991, 16 pages.

Lin, C.H., et al., "A New Framework for Recognition of Mandarin Syllables With Tones Using Sub-syllabic Unites," IEEE International Conference on Acoustics, Speech, and Signal Processing (ICASSP-93), Apr. 27-30, 1993, 4 pages.

Linde, Y., et al., "An Algorithm for Vector Quantizer Design," IEEE Transactions on Communications, vol. 28, No. 1, Jan. 1980, 12 pages.

Liu, F.H., et al., "Efficient Joint Compensation of Speech for the Effects of Additive Noise and Linear Filtering," IEEE International Conference of Acoustics, Speech, and Signal Processing, ICASSP-92, Mar. 23-26, 1992, 4 pages.

Logan, B., "Mel Frequency Cepstral Coefficients for Music Modeling," in International Symposium on Music Information Retrieval, 2000, 2 pages.

Lowerre, B. T., "The-HARPY Speech Recognition System," Doctoral Dissertation, Department of Computer Science, Carnegie Mellon University, Apr. 1976, 20 pages.

Maghbouleh, A., "An Empirical Comparison of Automatic Decision Tree and Linear Regression Models for Vowel Durations," Revised version of a paper presented at the Computational Phonology in Speech Technology workshop, 1996 annual meeting of the Association for Computational Linguistics in Santa Cruz, California, 7 pages.

Markel, J. D., et al., "Linear Prediction of Speech," Springer-Verlag, Berlin Heidelberg New York 1976, 12 pages.

Morgan, B., "Business Objects," (Business Objects for Windows) Business Objects Inc., DBMS Sep. 1992, vol. 5, No. 10, 3 pages.

Mountford, S. J., et al., "Talking and Listening to Computers," The Art of Human-Computer Interface Design, Copyright © 1990 Apple Computer, Inc. Addison-Wesley Publishing Company, Inc., 17 pages.

Murty, K. S. R., et al., "Combining Evidence from Residual Phase and MFCC Features for Speaker Recognition," IEEE Signal Processing Letters, vol. 13, No. 1, Jan. 2006, 4 pages.

Murveit H. et al., "Integrating Natural Language Constraints into HMM-based Speech Recognition," 1990 International Conference on Acoustics, Speech, and Signal Processing, Apr. 3-6, 1990, 5 pages.

Nakagawa, S., et al., "Speaker Recognition by Combining MFCC and Phase Information," IEEE International Conference on Acoustics Speech and Signal Processing (ICASSP), Mar. 14-19, 2010, 4 pages.

Niesler, T. R., et al., "A Variable-Length Category-Based N-Gram Language Model," IEEE International Conference on Acoustics, Speech, and Signal Processing (ICASSP'96), vol. 1, May 7-10, 1996, 6 pages.

Papadimitriou, C. H., et al., "Latent Semantic Indexing: A Probabilistic Analysis," Nov. 14, 1997, http://citeseerx.ist.psu.edu/messages/downloadsexceeded.html, 21 pages.

Parsons, T.W., "Voice and Speech Processing," Linguistics and Technical Fundamentals, Articulatory Phonetics and Phonemics, © 1987 McGraw-Hill, Inc., ISBN: 0-07-0485541-0, 5 pages.

Parsons, T. W., "Voice and Speech Processing," Pitch and Formant Estimation, © 1987 McGraw-Hill, Inc., ISBN: 0-07-0485541-0, 15 pages.

Picone, J., "Continuous Speech Recognition Using Hidden Markov Models," IEEE ASSP Magazine, vol. 7, No. 3, Jul. 1990, 16 pages.

Rabiner, L. R., et al., "Fundamental of Speech Recognition," © 1993 AT&T, Published by Prentice-Hall, Inc., ISBN: 0-13-285826-6, 17 pages.

Rabiner, L. R., et al., "Note on the Properties of a Vector Quantizer for LPC Coefficients," The Bell System Technical Journal, vol. 62, No. 8, Oct. 1983, 9 pages.

Ratcliffe, M., "ClearAccess 2.0 allows SQL searches off-line," (Structured Query Language), ClearAcess Corp., MacWeek Nov. 16, 1992, vol. 6, No. 41, 2 pages.

Remde, J. R., et al., "SuperBook: An Automatic Tool for Information Exploration-Hypertext?," in Proceedings of Hypertext'87 papers, Nov. 13-15, 1987, 14 pages.

(56) References Cited

OTHER PUBLICATIONS

Reynolds, C. F., "On-Line Reviews: A New Application of the HICOM Conferencing System," IEE Colloquium on Human Factors in Electronic Mail and Conferencing Systems, Feb. 3, 1989, 4 pages.
Rigoll, G., "Speaker Adaptation for Large Vocabulary Speech Recognition Systems Using Speaker Markov Models," International Conference on Acoustics, Speech, and Signal Processing (ICASSP'89), May 23-26, 1989, 4 pages.
Riley, M. D., "Tree-Based Modelling of Segmental Durations," Talking Machines Theories, Models, and Designs, 1992 © Elsevier Science Publishers B.V., North-Holland, ISBN: 08-444-89115.3, 15 pages.
Rivoira, S., et al., "Syntax and Semantics in a Word-Sequence Recognition System," IEEE International Conference on Acoustics, Speech, and Signal Processing (ICASSP'79), Apr. 1979, 5 pages.
Rosenfeld, R., "A Maximum Entropy Approach to Adaptive Statistical Language Modelling," Computer Speech and Language, vol. 10, No. 3, Jul. 1996, 25 pages.
Roszkiewicz, A., "Extending your Apple," Back Talk—Lip Service, A+ Magazine, The Independent Guide for Apple Computing, vol. 2, No. 2, Feb. 1984, 5 pages.
Sakoe, H., et al., "Dynamic Programming Algorithm Optimization for Spoken Word Recognition," IEEE Transactins on Acoustics, Speech, and Signal Processing, Feb. 1978, vol. ASSP-26 No. 1, 8 pages.
Salton, G., et al., "On the Application of Syntactic Methodologies in Automatic Text Analysis," Information Processing and Management, vol. 26, No. 1, Great Britain 1990, 22 pages.
Savoy, J., "Searching Information in Hypertext Systems Using Multiple Sources of Evidence," International Journal of Man-Machine Studies, vol. 38, No. 6, Jun. 1993, 15 pages.
Scagliola, C., "Language Models and Search Algorithms for Real-Time Speech Recognition," International Journal of Man-Machine Studies, vol. 22, No. 5, 1985, 25 pages.
Schmandt, C., et al., "Augmenting a Window System with Speech Input," IEEE Computer Society, Computer Aug. 1990, vol. 23, No. 8, 8 pages.
Schütze, H., "Dimensions of Meaning," Proceedings of Supercomputing'92 Conference, Nov. 16-20, 1992, 10 pages.
Sheth B., et al., "Evolving Agents for Personalized Information Filtering," in Proceedings of the Ninth Conference on Artificial Intelligence for Applications, Mar. 1-5, 1993, 9 pages.
Shikano, K., et al., "Speaker Adaptation Through Vector Quantization," IEEE International Conference on Acoustics, Speech, and Signal Processing (ICASSP'86), vol. 11, Apr. 1986, 4 pages.
Sigurdsson, S., et al., "Mel Frequency Cepstral Coefficients: An Evaluation of Robustness of MP3 Encoded Music," in Proceedings of the 7th International Conference on Music Information Retrieval (ISMIR), 2006, 4 pages.
Silverman, K. E. A., et al., "Using a Sigmoid Transformation for Improved Modeling of Phoneme Duration," Proceedings of the IEEE International Conference on Acoustics, Speech, and Signal Processing, Mar. 15-19, 1999, 5 pages.
Tenenbaum, A.M., et al., "Data Structure Using Pascal," 1981 Prentice-Hall, Inc., 34 pages.
Tsai, W.H., et al., "Attributed Grammar—A Tool for Combining Syntactic and Statistical Approaches to Pattern Recognition," IEEE Transactions on Systems, Man, and Cybernetics, vol. SMC-10, No. 12, Dec. 1980, 13 pages.
Udell, J., "Computer Telephony," BYTE, vol. 19, No. 7, Jul. 1, 1994, 9 pages.
van Santen, J. P. H., "Contextual Effects on Vowel Duration," Journal Speech Communication, vol. 11, No. 6, Dec. 1992, 34 pages.
Vepa, J., et al., "New Objective Distance Measures for Spectral Discontinuities in Concatenative Speech Synthesis," in Proceedings of the IEEE 2002 Workshop on Speech Synthesis, 4 pages.
Verschelde, J., "MATLAB Lecture 8. Special Matrices in MATLAB," Nov. 23, 2005, UIC Dept. of Math., Stat.. & C.S., MCS 320, Introduction to Symbolic Computation, 4 pages.
Vingron, M. "Near-Optimal Sequence Alignment," Deutsches Krebsforschungszentrum (DKFZ), Abteilung Theoretische Bioinformatik, Heidelberg, Germany, Jun. 1996, 20 pages.
Werner, S., et al., "Prosodic Aspects of Speech," Université de Lausanne, Switzerland, 1994, Fundamentals of Speech Synthesis and Speech Recognition: Basic Concepts, State of the Art, and Future Challenges, 18 pages.
Wikipedia, "Mel Scale," Wikipedia, the free encyclopedia, http://en.wikipedia.org/wiki/Mel_scale, 2 pages.
Wikipedia, "Minimum Phase," Wikipedia, the free encyclopedia, http://en.wikipedia.org./wiki/Minimum_phase, 8 pages.
Wolff, M., Poststructuralism and the ARTFUL Database: Some Theoretical Considerations, Information Technology and Libraries, vol. 13, No. 1, Mar. 1994, 10 pages.
Wu, M., "Digital Speech Processing and Coding," ENEE408G Capstone-Multimedia Signal Processing, Spring 2003, Lecture-2 course presentation, University of Maryland, College Park, 8 pages.
Wu, M., "Speech Recognition, Synthesis, and H.C.I.," ENEE408G Capstone-Multimedia Signal Processing, Spring 2003, Lecture-3 course presentation, University of Maryland, College Park, 11 pages.
Wyle, M. F., "A Wide Area Network Information Filter," in Proceedings of First International Conference on Artificial Intelligence on Wall Street, Oct. 9-11, 1991, 6 pages.
Yankelovich, N., et al., "Intermedia: The Concept and the Construction of a Seamless Information Environment," Computer Magazine, Jan. 1988, © 1988 IEEE, 16 pages.
Yoon, K., et al., "Letter-to-Sound Rules for Korean," Department of Linguistics, The Ohio State University, 2002, 4 pages.
Zhao, Y., "An Acoustic-Phonetic-Based Speaker Adaptation Technique for Improving Speaker-Independent Continuous Speech Recognition," IEEE Transactions on Speech and Audio Processing, vol. 2, No. 3, Jul. 1994, 15 pages.
Zovato, E., et al., "Towards Emotional Speech Synthesis: A Rule Based Approach," 2 pages.
International Search Report dated Nov. 9, 1994, received in International Application No. PCT/US1993/12666, which corresponds to U.S. Appl. No. 07/999,302, 8 pages (Robert Don Strong).
International Preliminary Examination Report dated Mar. 1, 1995, received in International Application No. PCT/US1993/12666, which corresponds to U.S. Appl. No. 07/999,302, 5 pages (Robert Don Strong).
International Preliminary Examination Report dated Apr. 10, 1995, received in International Application No. PCT/US1993/12637, which corresponds to U.S. Appl. No. 07/999,354, 7 pages (Alejandro Acero).
International Search Report dated Feb. 8, 1995, received in International Application No. PCT/US1994/11011, which corresponds to U.S. Appl. No. 08/129,679, 7 pages (Yen-Lu Chow).
International Preliminary Examination Report dated Feb. 28, 1996, received in International Application No. PCT/US1994/11011, which corresponds to U.S. Appl. No. 08/129,679, 4 pages (Yen-Lu Chow).
Written Opinion dated Aug. 21, 1995, received in International Application No. PCT/US1994/11011, which corresponds to U.S. Appl. No. 08/129,679, 4 pages (Yen-Lu Chow).
International Search Report dated Nov. 8, 1995, received in International Application No. PCT/US1995/08369, which corresponds to U.S. Appl. No. 08/271,639, 6 pages (Peter V. De Souza).
International Preliminary Examination Report dated Oct. 9, 1996, received in International Application No. PCT/US1995/08369, which corresponds to U.S. Appl. No. 08/271,639, 4 pages (Peter V. De Souza).

* cited by examiner

FAST, LANGUAGE-INDEPENDENT METHOD FOR USER AUTHENTICATION BY VOICE

RELATED APPLICATIONS

This application is a continuation of U.S. patent application Ser. No. 09/527,4989, filed Mar. 16, 2000 now abandoned.

FIELD OF THE INVENTION

The present invention relates to speech or voice recognition systems and more particularly to user authentication by speech or voice recognition.

BACKGROUND OF THE INVENTION

The field of user authentication has received increasing attention over the past decade. To enable around-the-clock availability of more and more personal services, many sophisticated transactions have been automated, and remote database access has become pervasive. This, in turn, heightened the need to automatically and reliably establish a user's identity. In addition to standard password-type information, it is now possible to include, in some advanced authentication systems, a variety of biometric data, such as voice characteristics, retina patterns, and fingerprints.

In the context of voice processing, two areas of focus can be distinguished. Speaker identification is the process of determining which registered speaker provides a given utterance. Speaker verification, on the other hand, is the process of accepting or rejecting the identity of a speaker based upon an utterance. Collectively, they refer to the automatic recognition of a speaker (i.e., speaker authentication) on the basis of individual information present in the speech wave form. Most applications in which a voice sample is used as a key to confirm the identity of a speaker are classified as speaker verification. Many of the underlying algorithms, however, can be applied to both speaker identification and verification.

Speaker authentication methods may be divided into text-dependent and text-independent methods. Text-dependent methods require the speaker to say key phrases having the same text for both training and recognition trials, whereas text-independent methods do not rely on a specific text to be spoken. Text-dependent systems offer the possibility of verifying the spoken key phrase (assuming it is kept secret) in addition to the speaker identity, thus resulting in an additional layer of security. This is referred to as the dual verification of speaker and verbal content, which is predicated on the user maintaining the confidentiality of his or her pass-phrase.

On the other hand, text-independent systems offer the possibility of prompting each speaker with a new key phrase every time the system is used. This provides essentially the same level of security as a secret pass-phrase without burdening the user with the responsibility to safeguarding and remembering the pass-phrase. This is because prospective impostors cannot know in advance what random sentence will be requested and therefore cannot (easily) play back some illegally pre-recorded voice samples from a legitimate user. However, implicit verbal content verification must still be performed to be able to reject such potential impostors. Thus, in both cases, the additional layer of security may be traced to the use of dual verification.

In all of the above, the technology of choice to exploit the acoustic information is hidden Markov modeling (HMM) using phonemes as the basic acoustic units. Speaker verification relies on speaker-specific phoneme models while verbal content verification normally employs speaker-independent phoneme models. These models are represented by Gaussian mixture continuous HMMs, or tied-mixture HMMs, depending on the training data. Speaker-specific models are typically constructed by adapting speaker-independent phoneme models to each speaker's voice. During the verification stage, the system concatenates the phoneme models appropriately, according to the expected sentence (or broad phonetic categories, in the non-prompted text-independent case). The likelihood of the input speech matching the reference model is then calculated and used for the authentication decision. If the likelihood is high enough, the speaker/verbal content is accepted as claimed.

The crux of speaker authentication is the comparison between features of the input utterance and some stored templates, so it is important to select appropriate features for the authentication. Speaker identity is correlated with the physiological and behavioral characteristics of the speaker. These characteristics exist both in the spectral envelope (vocal tract characteristics) and in the supra-segmental features (voice source characteristics and dynamic features spanning several segments). As a result, the input utterance is typically represented by a sequence of short-term spectral measurements and their regression coefficients (i.e., the derivatives of the time function of these spectral measurements).

Since HMMs can efficiently model statistical variation in such spectral features, they have achieved significantly better performance than less sophisticated template-matching techniques, such as dynamic time-warping. However, HMMs require the a priori selection of a suitable acoustic unit, such as the phoneme. This selection entails the need to adjust the authentication implementation from one language to another, just as speech recognition systems must be re-implemented when moving from one language to another. In addition, depending on the number of context-dependent phonemes and other modeling parameters, the HMM framework can become computationally intensive.

SUMMARY OF THE INVENTION

A method and system for training a user authentication by voice signal are described. In one embodiment, a set of feature vectors are decomposed into speaker-specific recognition units. The speaker-specific recognition units are used to compute distribution values to train the voice signal. In addition, spectral feature vectors are decomposed into speaker-specific characteristic units which are compared to the speaker-specific distribution values. If the speaker-specific characteristic units are within a threshold limit of the speaker-specific distribution values, the speech signal is authenticated.

BRIEF DESCRIPTION OF THE DRAWINGS

Features and advantages of the present invention will be apparent to one skilled in the art in light of the following detailed description in which.

DETAILED DESCRIPTION

A method and system for training a user authentication by voice signal are described. In one embodiment, a set of feature vectors are decomposed into speaker-specific recognition units. The speaker-specific recognition units are used to compute distribution values to train the voice signal. In addition, spectral feature vectors are decomposed into speaker-specific characteristic units which are compared to the speaker-specific distribution values. If the speaker-specific characteristic units are within a threshold limit of the speaker-specific distribution values, the speech signal is authenticated.

In one embodiment, an entire utterance is mapped into a single point in some low-dimensional space. The speaker identification/verification problem then becomes a matter of computing distances in that space. As time warping is no longer required, there is no longer a need for the HMM framework for the alignment of two sequences of feature vectors, nor any dependence on a particular phoneme set. As a result, the method is both fast and language-independent In one embodiment, verbal content verification may also be handled, although here time warping is unavoidable. Because of the lower dimensionality of the space, however, standard template-matching techniques yield sufficiently good results. Again, this obviates the need for a phoneme set, which means verbal content verification may also be done on a language-independent basis.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory in the form of a computer program. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

Figure 1:
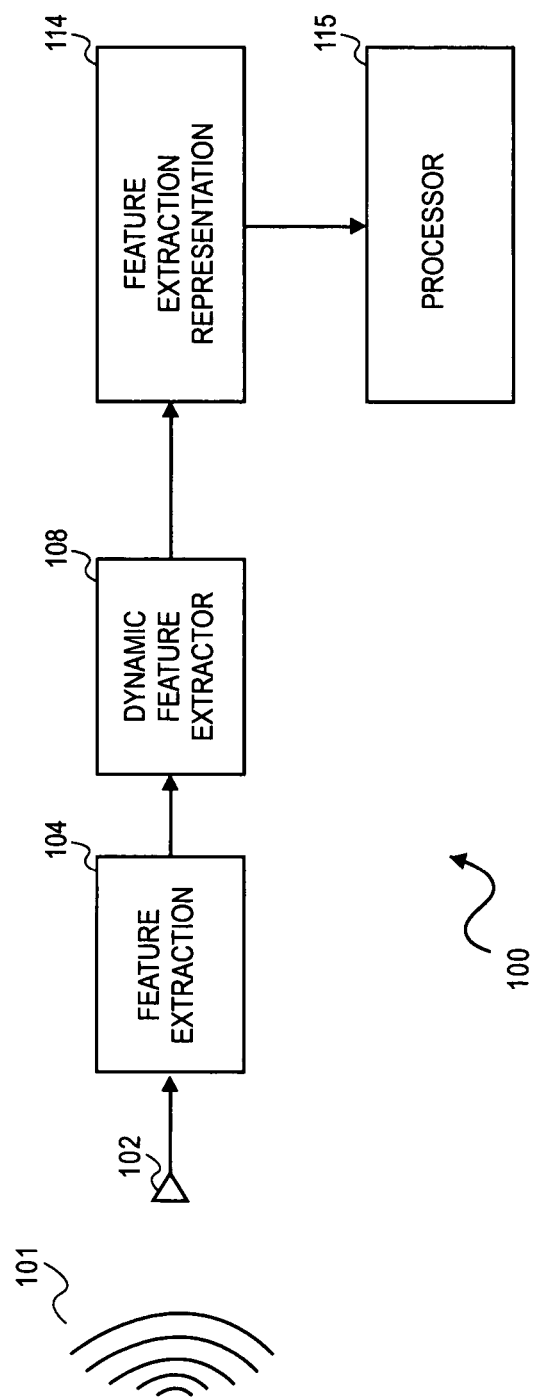
FIG. 1 is a block diagram of one embodiment of a user authentication system.

FIG. 1 is a block diagram of one embodiment of a user authentication system 100. Referring to FIG. 1, input device 102 receives a voice input 101 and converts voice input 101 into an electrical signal representative of the voice input 101. Feature extractor 104 receives the electrical signal and samples the signal at a particular frequency, the sampling frequency determined using techniques known in the art. In one embodiment, feature extractor 104 extracts the signal every 10 milliseconds. In addition, feature extractor 104 may use a Fast Fourier Transform (FFT) followed by Filter Bank Analysis on the input signal in order to provide a smooth spectral envelope of the input 101. This provides a stable representation from one repetition to another of a particular speaker's utterances. Feature extraction 104 passes the transformed signal to dynamic feature extractor 108. Dynamic feature extractor 108 extracts the first and second order regression coefficients for every frame of data. The first and second order regression coefficients are concatenated and passed from dynamic feature extractor 108 as feature extraction representation 114. In one embodiment, the feature extraction representation 114 is an M×N matrix which is a sequence of M feature vectors or frames of dimension N. In one embodiment, M is M is on the order of a few hundred and N is typically less than 100 for a typical utterance of a few seconds in length. After feature extraction representation 114 is created, the feature representation is decomposed into speaker-specific recognition units by processor 115 and speaker-specific recognition distribution values are computed from the recognition units.

User authentication system 100 may be hosted on a processor but is not so limited. In alternate embodiments, dynamic feature extractor 108 may comprise a combination of hardware and software that is hosted on a processor different from authentication feature extractor 104 and processor 115.

Figure 2:
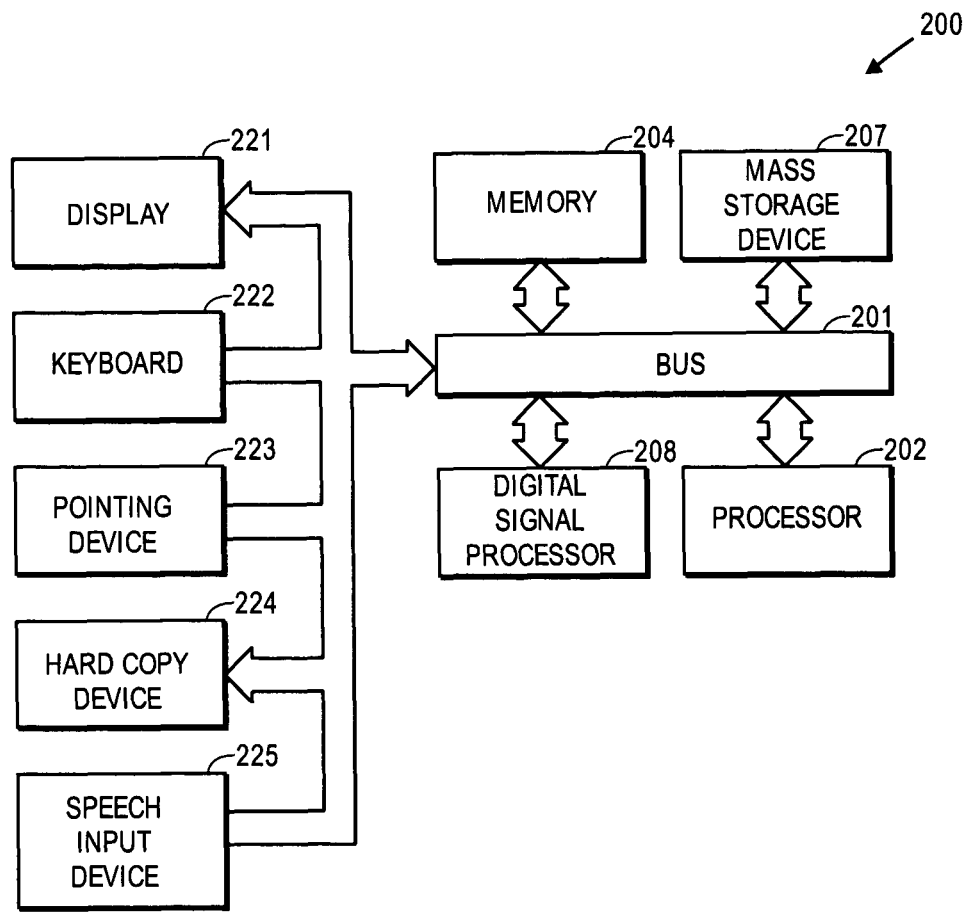
FIG. 2 is a block diagram of one embodiment for a computer system architecture of a user authentication system.

FIG. 2 is a block diagram of one embodiment for a computer system architecture 200 that may be used for user authentication system 100. Referring to FIG. 2, computer system 200 includes system bus 201 used for communication among the various components of computer system 200. Computer system 200 also includes processor 202, digital signal processor 208, memory 204, and mass storage device 207. System bus 201 is also coupled to receive inputs from keyboard 222, pointing device 223, and speech signal input device 225. In addition, system bus 201 provides outputs to display device 221 and hard copy device 224.

Figure 3:
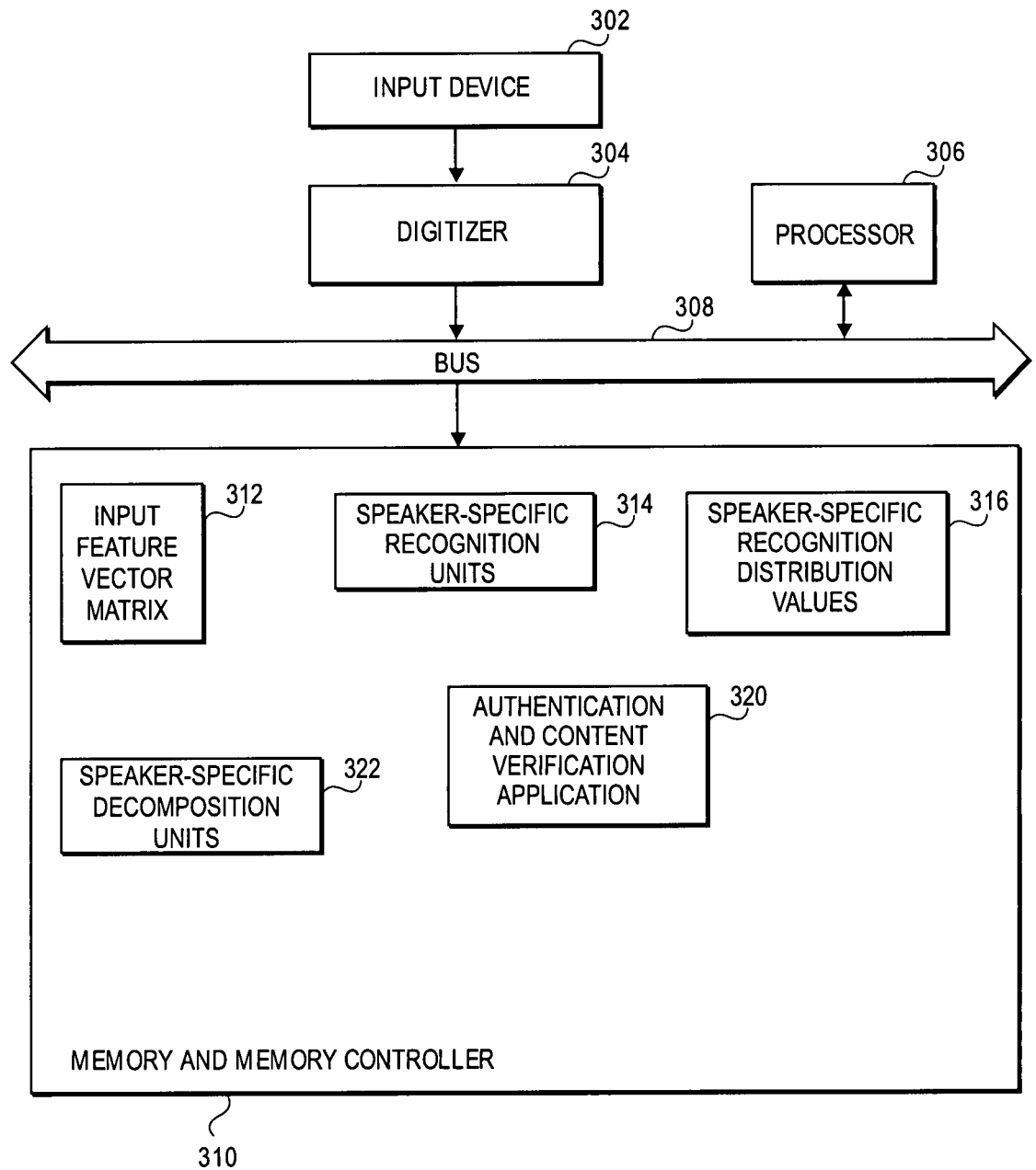
FIG. 3 is a block diagram of one embodiment for a computer system memory of FIG. 2.

FIG. 3 is a block diagram of one embodiment for a computer system memory 310 of a user authentication system 100. Referring to FIG. 3, input device 302 provides speech signals to a digitizer 304. Digitizer 304, or feature extractor, samples and digitize the speech signals for further processing. Digitizer 304 may include storage of the digitized speech signals in the speech input data memory component of memory 310 via system bus 308. Digitized speech signals are processed by digital processor 306 using authentication and content verification application 320.

In one embodiment, digitizer 304 extracts spectral feature vectors every 10 milliseconds. In addition, a short term Fast Fourier Transform followed by a Filter Bank Analysis is used to ensure a smooth spectral envelope of the input spectral features. The first and second order regression coefficients of the spectral features are extracted. The first and second order regression coefficients, typically referred to as delta and delta-delta parameters, are concatenated to create input feature vector matrix 312. Input feature vector matrix 312 is an M×N matrix of frames (F). Within matrix 312, each row represents the spectral information for a frame and each column represents a particular spectral band over time. In one embodiment, the spectral information for all frames and all bands may include approximately 20,000 parameters. In one embodiment, a single value decomposition (SVD) of the matrix F is computed. The computation is as follows:

$$F = F' = USV^T$$

where U is the M×R matrix of left singular vectors, $U_m$ ($1 \leq m \leq M$), S is the (R×R) diagonal matrix of singular values $s_R$ ($1 \leq r \leq R$), V is the (N×R) matrix of right singular vectors $V_n$ ($1 \leq n \leq N$), R<<M, N is the order of the decomposition, and $^T$ denotes matrix transposition. A portion of the SVD of the matrix F (in one embodiment, the S or V portion) is stored in speaker-specific decomposition units 322.

During training sessions, multiple speaker-specific decomposition units 322 are created and speaker-specific recognition units 314 are generated from the decomposition units 322. Each speaker to be registered (1≤j≤J) provides a small number K, of training sentences. In one embodiment, K=4 and J=40. For each speaker, each sentence or utterance is then mapped into the SVD matrices and the R×R matrix is generated into a vector s for each input sentence k. This results in a set of vectors $s_{j,k}$ (1≤j≤J, 1≤k≤K), one for each training sentence of each speaker. In one embodiment, speaker-specific recognition distribution values 316 are computed for each speaker.

Memory 310 also includes authentication and content verification application 320 which compares speaker-specific recognition units 314 with the speaker specific recognition distribution values 316. If the difference between the speaker-specific recognition units 314 and the distribution values 316 is within an acceptable threshold or range, the authentication is accepted. This distance can be computed using any distance measure, such as Euclidean, Gaussian, or any other appropriate method. Otherwise, the authentication is rejected and the user may be requested to re-input the authentication sentence.

Figure 4:
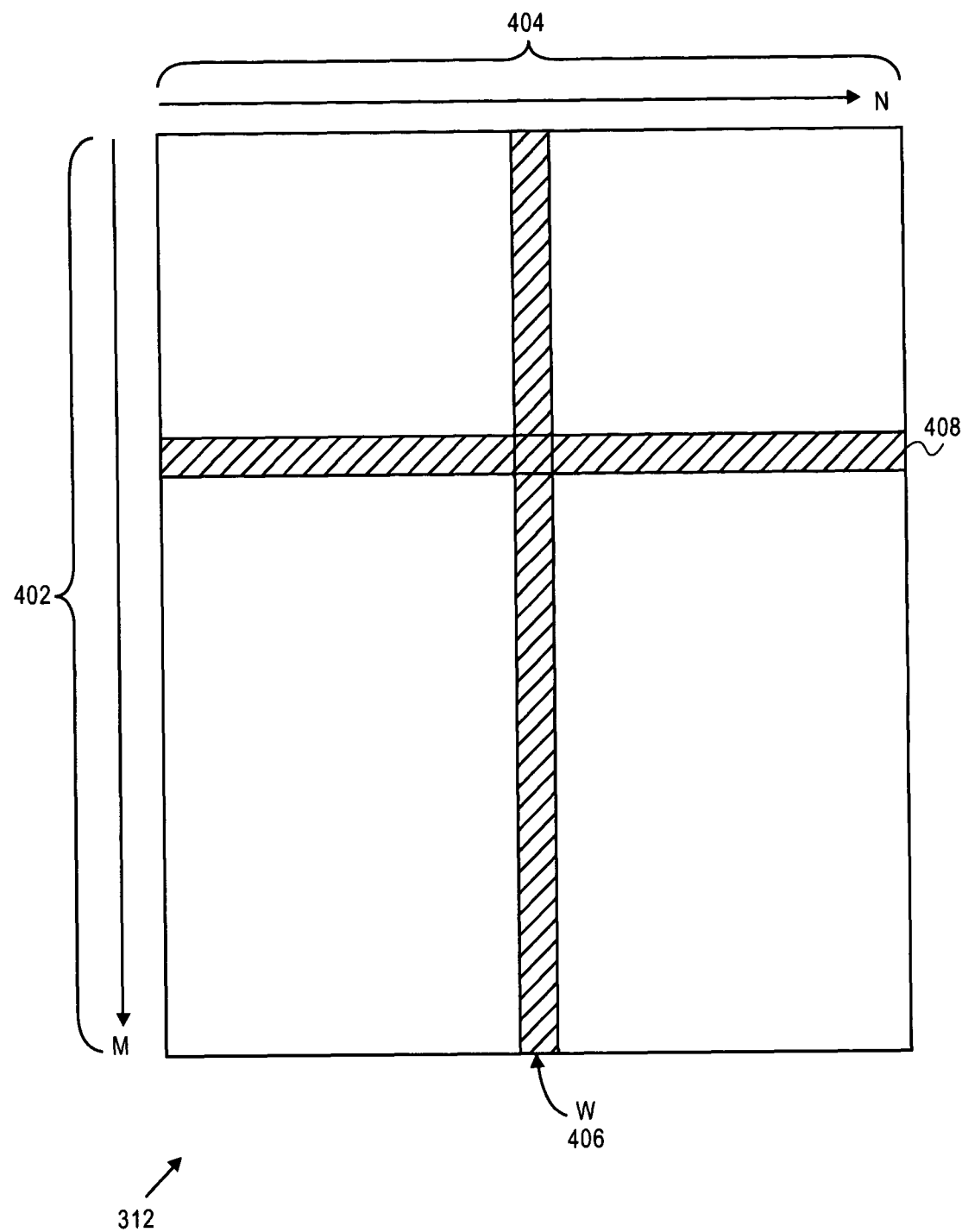
FIG. 4 is a block diagram of one embodiment for an input feature vector matrix of FIG. 3.

FIG. 4 is a block diagram of one embodiment for an input feature vector matrix 312. Input feature vector matrix 312 is a matrix of M feature vectors 420 of dimension N 404. In one embodiment, M is on the order of a few hundred and N is typically less than 100 for an utterance of a few seconds in length. Each utterance is represented by an individual M×N matrix 312 of frames F. Row 408 represents the spectral information for a frame and column 406 represents a particular spectral band over time. In one embodiment, the utterance may be extracted to produce approximately 20,000 parameters (M×N).

Figure 5:
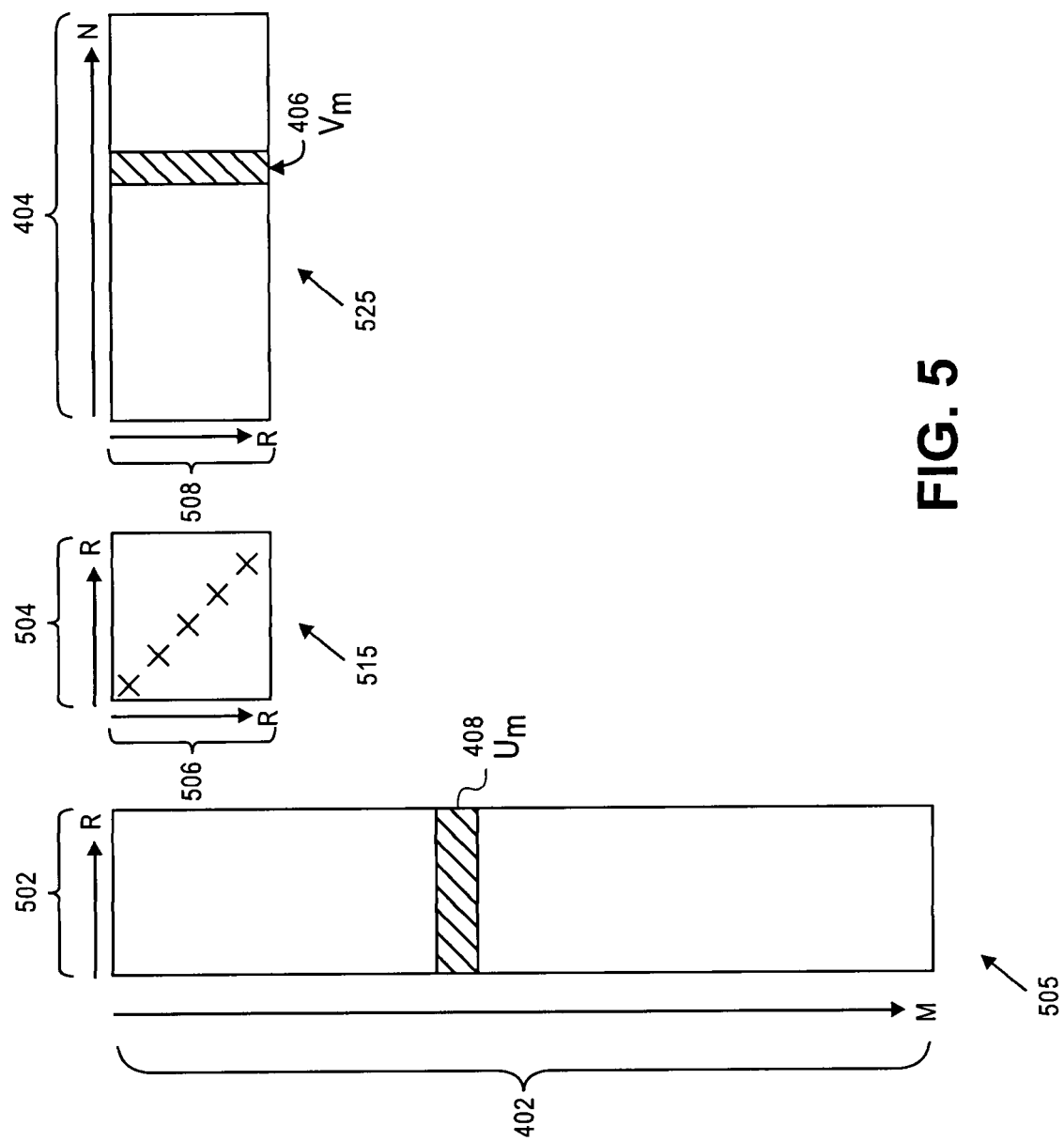
FIG. 5 is a block diagram of one embodiment for speaker-specific decomposition vectors of FIG. 3.

FIG. 5 is a block diagram of one embodiment for a speaker specific decomposition units 322. In one embodiment, singular value decomposition (SVD) of the matrix F is performed. The decomposition is as follows:

$$F = F' = USV^T$$

where U 505 is the M×R matrix of left singular vectors, $U_m$ (1≤m≤M), S 515 is the (R×R) diagonal matrix of singular values $s_r$ (1≤r≤R), and V 525 is the (N×R) matrix of right singular vectors $V_n$ (1≤n≤N), in which R<<M, N is the order of the decomposition, and T denotes matrix transposition. The singular value decomposition SVD of the matrix F is stored in speaker specific decomposition units 322.

The nth left singular vector $u_m$ 408 may be viewed as an alternative representation of the nth frame (that is, the nth eigenvector of the M×M matrix FF). The nth right singular vector $v_n$ 406 is an alternate representation of the nth spectral band (that is, the nth eigenvector of the N×N matrix 525 $F^TF$). The U matrix 505 comprises eigen-information related to the frame sequence across spectral bands, while the V matrix 525 comprises eigen-information related to the spectral band sequence across time. The S matrix 515 embodies the correlation between the given frame sequence and the given spectral band sequence which includes factors not directly related to the way frames are sequentially generated or spectral bands are sequentially derived. That is, the singular values $s_r$ should contain information that does not depend on the particular utterance text or spectral processing considered such as, for example, speaker-specific characteristics. The S matrix 515 is a diagonal matrix in which each entry in the diagonal of the matrix may be represented by $s_r$. The S matrix 515 may be represented by a vector s containing the R values $s_r$. With this notation, s encapsulates information related to the speaker characteristics.

The SVD defines the mapping between the original utterance and a single vector of dimension R containing speaker-specific information. Thus, s may be defined as the speaker-specific representation of the utterance in a low dimensional space. Comparing two utterances may be used to establish the speaker's identity by computing a suitable distance between two points in the space. In one embodiment, the Gaussian distance is used to account for the different scalings along different coordinates of the decomposition. In one embodiment, a five dimensional space is utilized to compute the distance.

Figure 6:
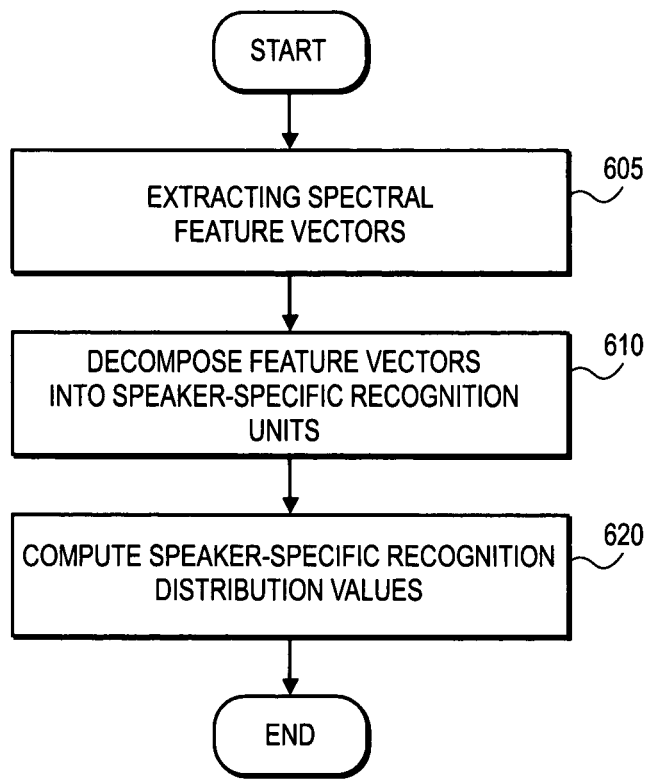
FIG. 6 is a flow diagram of one embodiment for user authentication by voice training.

FIG. 6 is a flow diagram of one embodiment for a user authentication by voice training. Initially at processing block 605, the spectral feature vectors for a user are extracted. During training, each speaker to be registered provides a small number of training sentences. In one embodiment, the user provides K=4 sentences. Each sentence is digitized into an individual input feature vector matrix 312.

At processing block 610, each input feature vector matrix 312 is decomposed into speaker-specific recognition units 322. The decomposition is as described in reference to FIG. 5. The decomposition results in a set of vectors $s_{j,k}$ (1≤j≤J, 1≤k≤K), one set of vectors for each training sentence of each speaker.

At processing block 620, speaker-specific recognition distribution values 316 are computed for each speaker. In one embodiment, a centroid for each speaker is determined using the following formula:

$$\bar{\mu}_j = \frac{1}{K}\sum_{k=1}^{K} S_{j,k},$$

In addition, the global covariance matrix is computed by the following formula:

$$G = \frac{1}{J}\frac{1}{K}\sum_{j=1}^{J}\sum_{k=1}^{K} (S_{j,k} - \mu_j)(S_{j,k} - \mu_j)^T$$

In one embodiment, the global variance matrix is used, as compared to speaker-specific covariances, as the estimation of the matrix becomes a problem in small sampling where K<R. (In general, in situations where the number of speakers and/or sentence is small, a pre-computed speaker-independent covariance matrix is used to increase reliability.)

Figure 7:
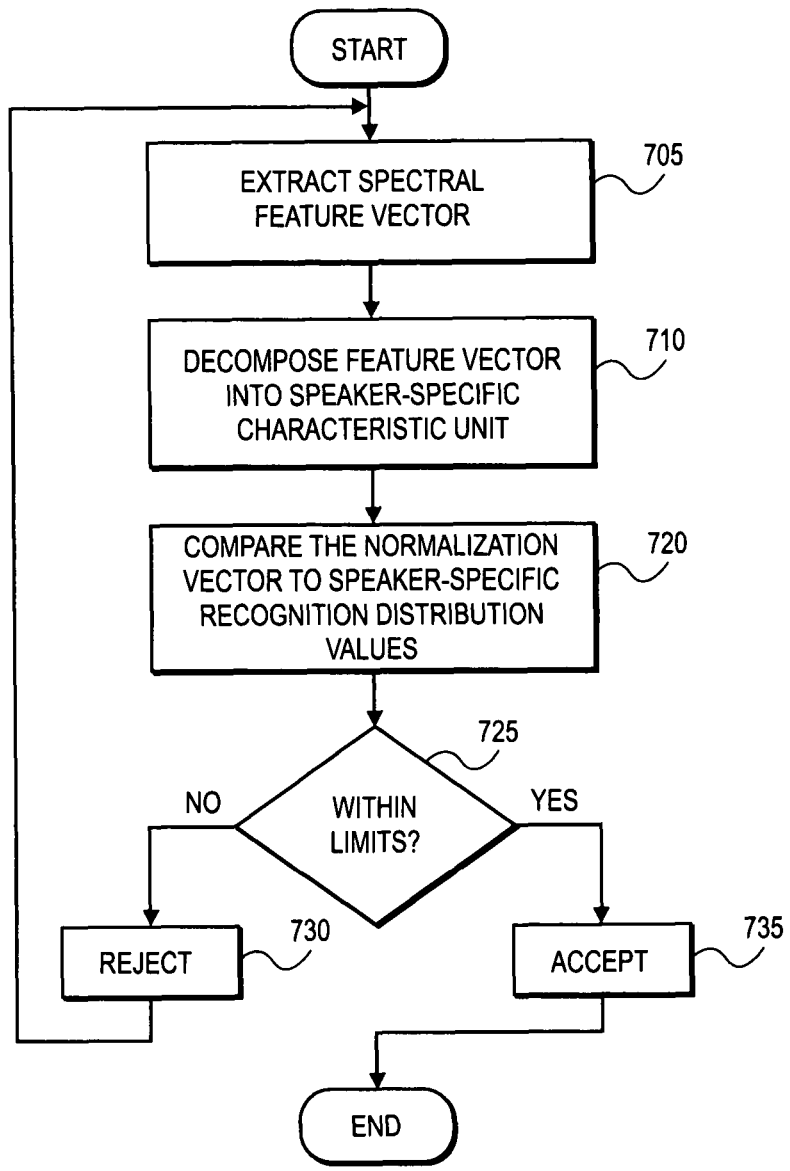
FIG. 7 is a flow diagram of one embodiment for user authentication by voice.

FIG. 7 is a flow diagram of one embodiment for user authentication by voice. Initially at processing block 705, a spectral feature vector is extracted for an input access sentence. The extraction process is similar to the extraction process of processing block 605 above.

At processing block 710, the input feature vector is decomposed into a speaker-specific characteristic unit 322. The SVD is applied to the input feature vector as described in reference to FIG. 5. The decomposition is as described above.

At processing block 720, the speaker-specific characteristic unit 322 is compared to the speaker-specific recognition distribution values 316 previously trained by the user. The speaker-specific characteristic unit 322 may be represented by $s_0$ which may be compared to the centroid associated with the speaker as identity is being claimed, $u_j$. For example, the distance between $s_0$ and $u_j$ may be computed as follows:

$$d(s_0, U_j) = (s_0 - U_j)^T G^{-1}(S_0 - U_j).$$

At processing block 725, the distance $d(s_0, U_j)$ is compared to a set threshold limit. If the distance $d(s_0, U_j)$ falls within the threshold, then at processing block 735, the user authentication is acceptable and the user is allowed to proceed. For example, if the user authentication is utilized to gain access to a personal computer, the user will be allowed to access the personal computer.

If at processing block 725, the distance $d(s_o, U_j)$ is not within the threshold limit, then at processing block 730, the user authentication is rejected and, in one embodiment, the user is returned to the beginning, at processing block 705, for input and retry of the input sentence. In one embodiment, the user may be allowed to attempt to enter the user authentication by voice a given number of times before the process terminates.

In an alternate embodiment, the threshold limit is not used and the following method is used for the authentication. The distance, $d(s_o, U_j)$, is computed for all registered speakers within the system. If the distance for the speaker as claimed is the smallest distance computed, and there is no other distance within the same appropriate ratio (for example, 15%) of the minimum distance, the speaker is accepted. The speaker is rejected if either of the above conditions is not true.

In one embodiment, for verbal content verification, the singular values are not used, since they do not contain information about the utterance text itself. However, this information is present in the sequence of left singular vectors $u_m$ ($1 \leq m \leq M$). So, comparing two utterances for verbal content can be done by comparing two sequences of left singular vectors, each of which is a trajectory in a space of dimension R. It is well-known that dynamic time-warping is more robust in a low-dimensional space than in a high-dimensional space. As a result, it can be taken advantage of within the SVD approach to perform verbal content verification.

Using dynamic time-warping, the time axes of the input $u_m$ sequence and the reference $u_m$ sequence are aligned, and the degree of similarity between them, accumulated from the beginning to the end of the utterance, is calculated. The degree of similarity is best determined using Gaussian distances, in a manner analogous to that previously described. Two issues are worth pointing out, however. First, the $u_m$ sequences tend to be fairly "jittery", which requires some smoothing before computing meaningful distances. A good choice is to use robust locally weighted linear regression to smooth out the sequence. Second, the computational load, compared to speaker verification, is greater by a factor equal to the average number of frames in each utterance. After smoothing, however, some downsampling may be done to speed-up the process.

The above system was implemented and released as one component of the voice login feature of MacOS 9. When tuned to obtain an equal number of false acceptances and false rejections, it operates at an error rate of approximately 4%. This figure is comparable to what is reported in the literature for HMM-based systems, albeit obtained at a lower computational cost and without any language restrictions.

The specific arrangements and methods herein are merely illustrative of the principles of this invention. Numerous modifications in form and detail may be made by those skilled in the art without departing from the true spirit and scope of the invention.

What is claimed is:

1. A method of speech-based user authentication, comprising:
at a device comprising one or more processors and memory:
receiving a spoken utterance of a speaker;
generating a phoneme-independent matrix based on the spoken utterance, wherein the phoneme-independent matrix comprises a plurality of phoneme-independent feature vectors each having been extracted from a respective frame sampled from the spoken utterance at a sampling frequency;
decomposing the phoneme-independent matrix into multiple sets of vectors including at least a first set of vectors defining at least one speaker-specific recognition unit and a second set of vectors defining at least one content reference sequence;
computing at least one speaker-specific distribution value based on at least the speaker-specific recognition unit; and
authenticating an input speech signal based on the at least one speaker-specific distribution value.

2. The method of claim 1 wherein decomposing the phoneme-independent matrix further comprises:
applying a singular value decomposition to the phoneme-independent matrix.

3. The method of claim 1 further comprising:
generating the speaker-specific recognition unit from a singular value matrix of a singular value decomposition of the phoneme-independent matrix.

4. The method of claim 1, wherein authenticating the input speech signal based on the at least one speaker-specific distribution value further comprises:
decomposing at least one phoneme-independent spectral feature vector of the input speech signal into at least one speaker-specific characteristic unit;
comparing the at least one speaker-specific characteristic unit to the at least one speaker-specific distribution value; and
authenticating the input speech signal if the at least one speaker-specific characteristic unit is within a threshold limit of the at least one speaker-specific distribution value.

5. The method of claim 4 wherein decomposing the at least one phoneme-independent spectral feature vector of an input speech signal into at least one speaker-specific characteristic unit further comprises:
applying a singular value decomposition to the at least one phoneme-independent spectral feature vector of the input speech signal.

6. The method of claim 4, wherein the at least one phoneme-independent spectral feature vector is further decomposed into at least one content input sequence and authenticating the speech signal further comprises:
authenticating the input speech signal if the at least one content input sequence is similar to the at least one content reference sequence.

7. The method of claim 6 further comprising:
determining similarity based on a distance calculated between the at least one content input sequence and the at least one content reference sequence.

8. A method of authenticating a speech signal comprising:
at a device comprising one or more processors and memory:
receiving a spoken utterance of an unauthenticated speaker;
generating a phoneme-independent matrix based on the spoken utterance, wherein the phoneme-independent matrix comprises a first plurality of phoneme-independent spectral feature vectors each having been extracted from a respective frame sampled from the spoken utterance at a sampling frequency;
decomposing the phoneme-independent matrix into a speaker-specific characteristic unit;
comparing the at least one speaker-specific characteristic unit to at least one speaker-specific distribution value, the at least one speaker-specific distribution value previously trained by a registered speaker and generated by decomposing a second plurality of phoneme-independent feature vectors into sets of vectors including at least a first set of vectors defining at least one speaker-specific recognition unit and a second set of vectors defining at least one content reference sequence; and authenticating the spoken utterance if the at least one speaker-specific characteristic unit is within a threshold limit of the at least one speaker-specific distribution value.

9. The method of claim 8 further comprising:
generating the speaker-specific characteristic unit from a singular value matrix of a singular value decomposition of the phoneme-independent matrix.

10. The method of claim 8 further comprising:
decomposing the second plurality of phoneme-independent feature vectors into the at least one speaker-specific recognition unit; and
computing the at least one speaker-specific distribution value from the at least one speaker-specific recognition unit.

11. The method of claim 10 further comprising:
generating the at least one speaker-specific recognition unit from a singular value matrix of a singular value decomposition of the second plurality of phoneme-independent feature vectors.

12. The method of claim 10 wherein decomposing the phoneme-independent matrix further comprises:
applying a singular value decomposition to the phoneme-independent matrix.

13. The method of claim 8 wherein decomposing the phoneme-independent matrix further comprises:
applying a singular value decomposition to the phoneme-independent matrix.

14. The method of claim 8, wherein the phoneme-independent matrix is further decomposed into at least one content input sequence and wherein authenticating the spoken utterance further comprises:
authenticating the spoken utterance if the at least one content input sequence is similar to at least one content reference sequence previously trained by the registered speaker.

15. The method of claim 14 further comprising:
determining similarity based on a distance calculated between the at least one content input sequence and the at least one content reference sequence.

16. A system for speech-based user authentication, comprising:
means for receiving a spoken utterance of a speaker;
means for generating a phoneme-independent matrix based on the spoken utterance, wherein the phoneme-independent matrix comprises a plurality of phoneme-independent feature vectors each having been extracted from a respective frame sampled from the spoken utterance at a sample frequency;
means for decomposing the phoneme-independent matrix into multiple sets of vectors including at least a first set of vectors defining at least one speaker-specific recognition unit and a second set of vectors defining at least one content reference sequence;
means for computing at least one speaker-specific distribution value based on at least the speaker-specific recognition unit; and
means for authenticating an input speech signal based on the at least one speaker-specific distribution value.

17. A system for authenticating a speech signal comprising:
means for receiving a spoken utterance of a speaker;
means for generating a phoneme-independent matrix based on the spoken utterance, wherein the phoneme-independent matrix comprises a first plurality of phoneme-independent spectral feature vectors each having been extracted from a respective frame sampled from the spoken utterance at a sampling frequency;
means for decomposing the phoneme-independent matrix into a speaker-specific characteristic unit;
means for comparing the at least one speaker-specific characteristic unit to at least one speaker-specific distribution value, the at least one speaker-specific distribution value previously trained by a registered speaker and generated by decomposing a second plurality of phoneme-independent feature vectors into sets of vectors including at least a first set of vectors defining at least one speaker-specific recognition unit and a second set of vectors defining at least one content reference sequence; and
means for authenticating the spoken utterance if the at least one speaker-specific characteristic unit is within a threshold limit of the at least one speaker-specific distribution value.

18. The system of claim 17, wherein the phoneme-independent matrix is further decomposed into at least one content input sequence and wherein the means for authenticating the spoken utterance further authenticates the spoken utterance if the at least one content input sequence is similar to at least one content reference sequence previously trained by the registered speaker.

19. The system of claim 18, wherein the means for comparing further determines similarity based on a distance calculated between the at least one content input sequence and the at least one content reference sequence.

20. A non-transitory computer readable medium comprising instructions, which when executed on a processor, perform a method of speech-based user authentication, comprising:
receiving a spoken utterance of a speaker;
generating a phoneme-independent matrix based on the spoken utterance, wherein the phoneme-independent matrix comprises a plurality of phoneme-independent feature vectors each having been extracted from a respective frame sampled from the spoken utterance at a sampling frequency;
decomposing the phoneme-independent matrix into multiple sets of vectors including at least a first set of vectors defining at least one speaker-specific recognition unit and a second set of vectors defining at least one content reference sequence
computing at least one speaker-specific distribution value based on at least the speaker-specific recognition unit; and
authenticating an input speech signal based on the at least one speaker-specific distribution value.

21. A non-transitory computer readable medium comprising instructions, which when executed on a processor, perform a method for authenticating a speech signal, comprising:
receiving a spoken utterance of a speaker;
generating a phoneme-independent matrix based on the spoken utterance, wherein the phoneme-independent matrix comprises a first plurality of phoneme-independent spectral feature vectors each having been extracted from a respective frame sampled from the spoken utterance at a sampling frequency;

decomposing the phoneme-independent matrix into a speaker-specific characteristic unit;
comparing the at least one speaker-specific characteristic unit to at least one speaker-specific distribution value, the at least one speaker-specific distribution value previously trained by a registered speaker and generated by decomposing a second plurality of phoneme-independent feature vectors into sets of vectors, including at least a first set of vectors defining at least one speaker-specific recognition unit and a second set of vectors defining at least one content reference sequence; and
authenticating the spoken utterance if the at least one speaker-specific characteristic unit is within a threshold limit of the at least one speaker-specific distribution value.

22. The computer readable medium of claim 21, wherein the phoneme-independent matrix is further decomposed into at least one content input sequence and wherein authenticating the speech signal further comprises:
authenticating the speech signal if the at least one content input sequence is similar to at least one content reference sequence previously trained by the registered speaker.

23. The computer-readable medium of claim 22, wherein the method further comprises:
determining similarity based on a distance calculated between the at least one content input sequence and the at least one content reference sequence.

24. A system for speech-based user authentication, comprising:
a processor configured to
receive a spoken utterance of a speaker,
generate a phoneme-independent matrix based on the spoken utterance, wherein the phoneme-independent matrix comprises a plurality of phoneme-independent feature vectors each having been extracted from a respective frame sampled from the spoken utterance at a sampling frequency,
decompose the phoneme-independent matrix into multiple sets of vectors at least a first set of vectors defining at least one speaker-specific recognition unit and a second set of vectors defining at least one content reference sequence,
compute at least one speaker-specific distribution value based on at least the speaker-specific recognition unit; and
authenticate an input speech signal based on the at least one speaker-specific distribution value.

25. The system of claim 24 wherein the processor is further configured to decompose the phoneme-independent matrix into the at least one speaker-specific recognition unit.

26. The system of claim 25 wherein the processor is further configured to apply a singular value decomposition to the phoneme-independent matrix to generate the at least one speaker-specific recognition unit.

27. The system of claim 24 wherein the processor is further configured to generate the at least one speaker-specific recognition unit from a singular value matrix of a singular value decomposition of the phoneme-independent matrix.

28. The system of claim 24 wherein the processor is further configured to decompose at least one phoneme-independent spectral feature vector of an input speech signal into at least one speaker-specific characteristic unit, and authenticate the speech signal if the at least one speaker-specific characteristic unit is within a threshold limit of the at least one speaker-specific distribution value.

29. The system of claim 28 wherein the processor is further configured to apply a singular value decomposition to the at least one phoneme-independent spectral feature vector of the input speech signal.

30. The system of claim 28, wherein the processor is further configured to decompose the at least one phoneme-independent spectral feature vector of the input speech signal into at least one content input sequence, and to authenticate the input speech signal if the at least one content input sequence is similar to the at least one content reference sequence.

31. The system of claim 30, wherein the processor is further configured to determine similarity based on a distance calculated between the at least one content input sequence and the at least one content reference sequence.

32. A system for authenticating a speech signal comprising:
a processor to
receive a spoken utterance of an unauthenticated speaker,
generate a phoneme-independent matrix based on the spoken utterance, wherein the phoneme-independent matrix comprises a first plurality of phoneme-independent spectral feature vectors each having been extracted from a respective frame sampled from the spoken utterance at a sampling frequency,
decompose the phoneme-independent matrix into a speaker-specific characteristic unit,
compare the at least one speaker-specific characteristic unit to at least one speaker-specific distribution value, the at least one speaker-specific distribution value previously trained by a registered speaker, and
authenticate the spoken utterance if the at least one speaker-specific characteristic unit is within a threshold limit of the at least one speaker-specific distribution value, wherein the at least one speaker-specific distribution value is generated by decomposing a second plurality of phoneme-independent feature vectors into sets of vectors including a first set of vectors defining at least one speaker-specific recognition unit and a second set of vectors defining at least one content reference sequence.

33. The system of claim 32 wherein the processor is further configured to apply a singular value decomposition to the phoneme-independent matrix.

34. The system of claim 32 wherein the processor is further configured to generate the at least one speaker-specific characteristic unit from a singular value matrix of a singular value decomposition of the phoneme-independent matrix.

35. The system of claim 32 wherein the processor is further configured to decompose the second plurality of phoneme-independent feature vectors into the at least one speaker-specific recognition unit, and compute the at least one speaker-specific distribution value from the at least one speaker-specific recognition unit.

36. The system of claim 35 further comprising:
a feature extractor to extract the second plurality of phoneme-independent feature vectors into a speaker-specific feature extraction representation.

37. The system of claim 36 wherein the processor is further configured to decompose the speaker-specific feature extraction representation into the at least one speaker-specific recognition unit.

38. The system of claim 37 wherein the processor is further configured to apply a singular value decomposition to the speaker-specific extraction representation to generate the at least one speaker-specific recognition unit.

39. The system of claim 35 wherein the processor is further configured to generate the at least one speaker-specific recognition unit from a singular value matrix of a singular value decomposition of the second plurality of phoneme-independent feature vectors.

40. The system of claim 32, wherein the phoneme-independent matrix is further decomposed into at least one content input sequence and wherein the processor is further configured to authenticate the spoken utterance if the at least one content input sequence is similar to at least one content reference sequence previously trained by the registered speaker.

41. The system of claim 40, wherein the processor is further configured to determine similarity based on a distance calculated between the at least one content input sequence and the at least one content reference sequence.

* * * * *